United States Patent
Yoshida

(10) Patent No.: US 9,389,781 B2
(45) Date of Patent: Jul. 12, 2016

(54) INFORMATION PROCESSING APPARATUS, METHOD FOR CONTROLLING SAME, AND RECORDING MEDIUM

(71) Applicant: CANON KABUSHIKI KAISHA, Tokyo (JP)

(72) Inventor: Masafumi Yoshida, Ashigarakami-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/325,089

(22) Filed: Jul. 7, 2014

(65) Prior Publication Data

US 2015/0015507 A1 Jan. 15, 2015

(30) Foreign Application Priority Data

Jul. 9, 2013 (JP) .................................. 2013-143696

(51) Int. Cl.
*G06F 3/041* (2006.01)
*G06F 3/048* (2013.01)
*G06F 3/0488* (2013.01)
*G06F 3/0484* (2013.01)

(52) U.S. Cl.
CPC ............ *G06F 3/04883* (2013.01); *G06F 3/041* (2013.01); *G06F 3/0484* (2013.01); *G06F 2203/04808* (2013.01)

(58) Field of Classification Search
CPC .... G06F 3/041; G06F 3/0484; G06F 3/04883
See application file for complete search history.

(56) References Cited

U.S. PATENT DOCUMENTS

2013/0088521 A1* 4/2013 Katou ..................... G09G 5/34
                                                          345/684
2013/0335341 A1* 12/2013 Ishibashi ............. G06F 3/04883
                                                         345/173

FOREIGN PATENT DOCUMENTS

JP 2012-168890 A 9/2012
JP 5262990 B2 8/2013

* cited by examiner

*Primary Examiner* — Dwayne Bost
*Assistant Examiner* — Christopher Kohlman
(74) *Attorney, Agent, or Firm* — Canon USA Inc. IP Division

(57) ABSTRACT

A method for controlling an information processing apparatus configured to perform processing according to a type of an input operation, includes determining that the same type of operation as an operation input immediately before is likely to be repeated, based on input information of interest and information about the operation input immediately before, identifying by an identification unit an input operation based on the information of interest according to that the information of interest satisfies a predetermined condition set in advance, and setting, if the determination unit has determined that a same type of operation as the operation input immediately before is likely to be repeated, a condition for the identification unit to identify the operation input based on the information of interest as the same type of operation as the operation input immediately before so that the condition is easier to be satisfied than the predetermined condition.

22 Claims, 18 Drawing Sheets

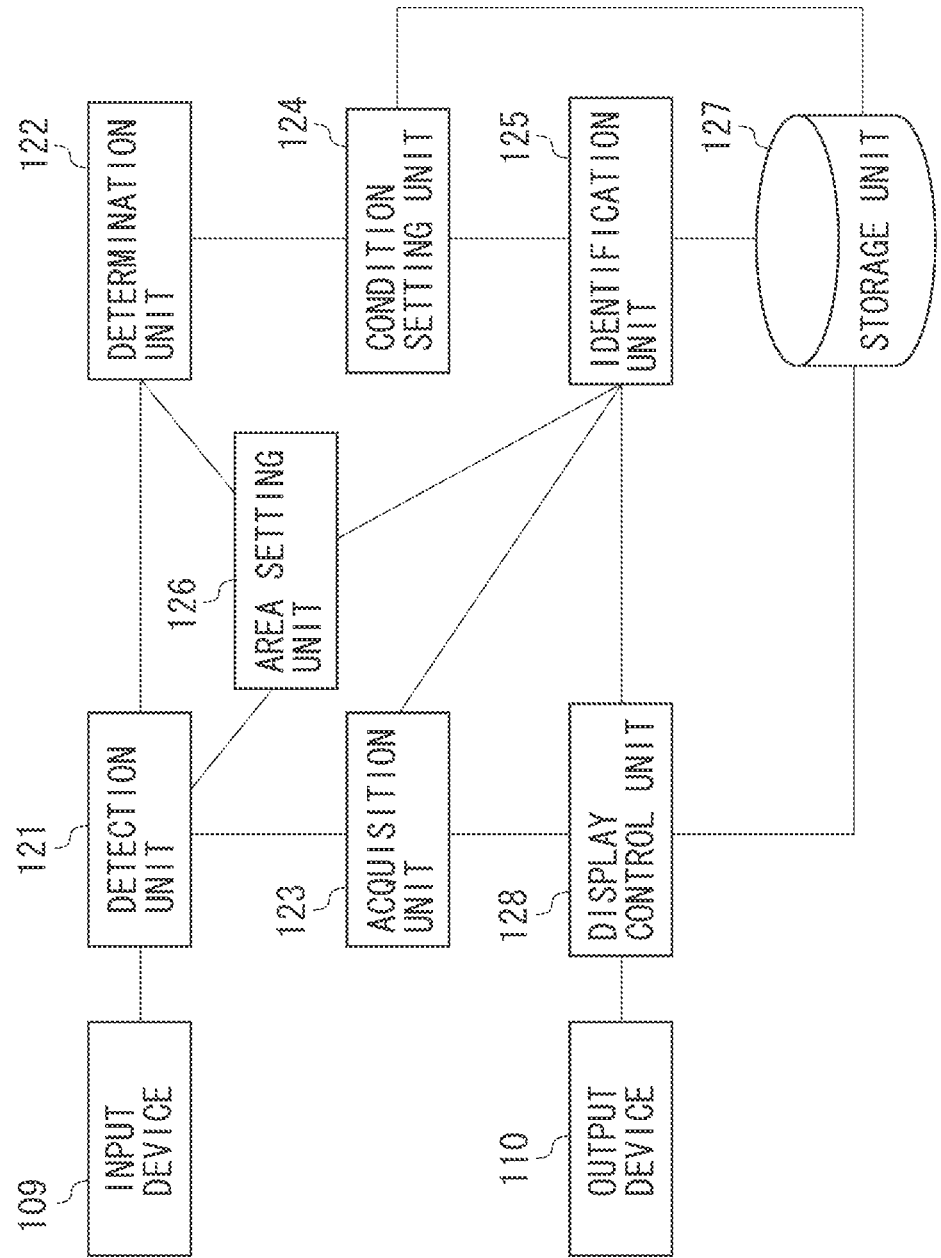

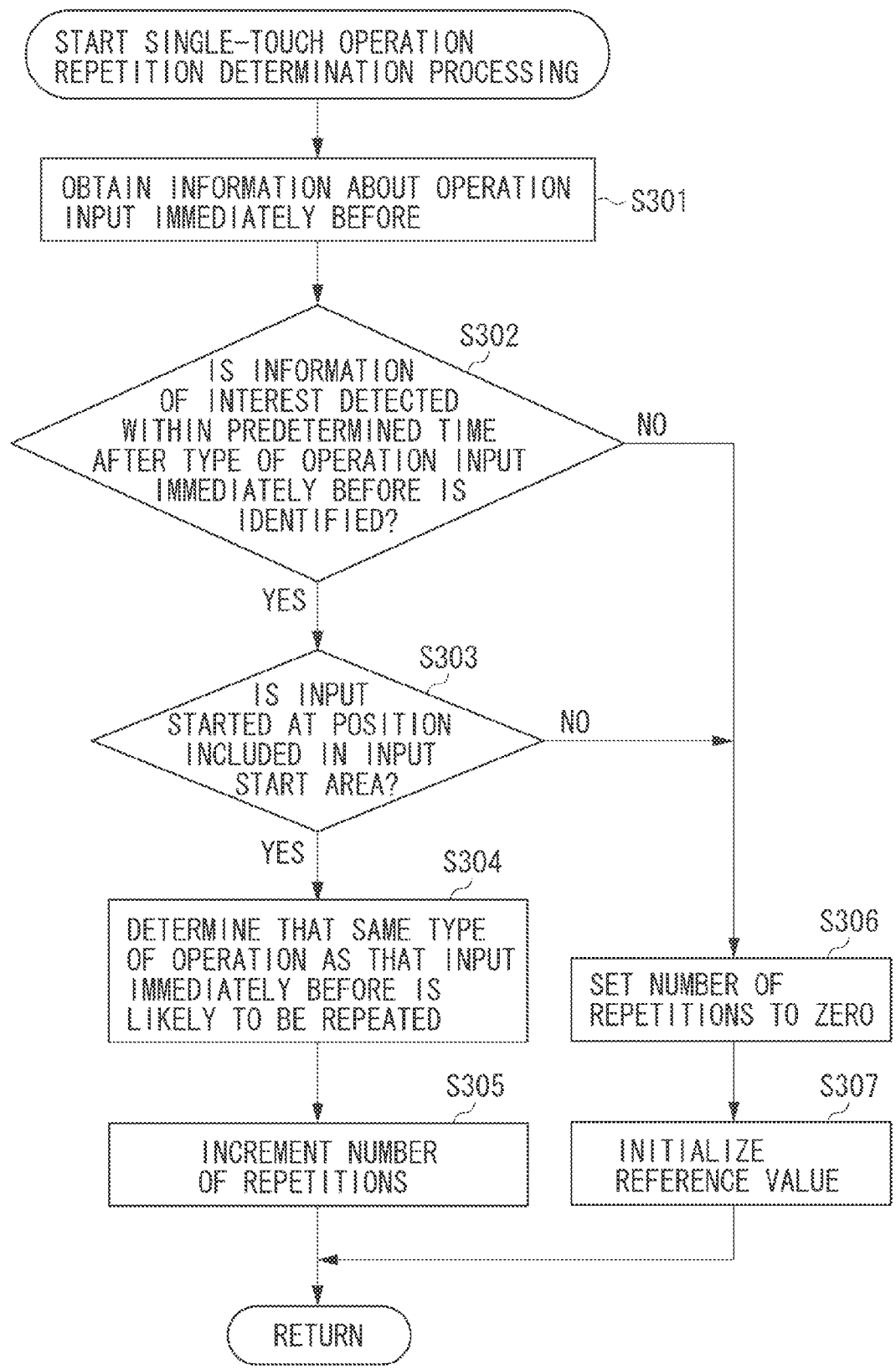

FIG. 9A

| NUMBER OF REPETITIONS | REFERENCE VALUE FOR FLICK OPERATION TO BE IDENTIFIED |
|---|---|
| | AMOUNT OF MOVEMENT PER UNIT TIME |
| ONE | 20 |
| TWO | 10 |
| THREE OR MORE | 5 |

FIG. 9B

| NUMBER OF REPETITIONS | REFERENCE VALUE FOR MULTI-DRAG OPERATION TO BE IDENTIFIED |
|---|---|
| | MOVING DISTANCE |
| ONE | 20 |
| TWO | 10 |
| THREE OR MORE | 5 |

FIG. 9C

| NUMBER OF REPETITIONS | REFERENCE VALUE FOR PINCH OPERATION TO BE IDENTIFIED / AMOUNT OF CHANGE IN DISTANCE BETWEEN TWO TOUCH POSITIONS |
|---|---|
| ONE | 20 |
| TWO | 10 |
| THREE OR MORE | 5 |

FIG. 9D

| NUMBER OF REPETITIONS | OUTPUT VALUE OF PINCH OPERATION / CORRECTION VALUE |
|---|---|
| ONE | 1.2 |
| TWO | 1.5 |
| THREE OR MORE | 2.0 |

INFORMATION PROCESSING APPARATUS, METHOD FOR CONTROLLING SAME, AND RECORDING MEDIUM

BACKGROUND OF THE INVENTION

1. Field of the Invention

The present disclosure generally relates to information processing and, more particularly, to an information processing apparatus, method and medium, and a technique for identifying an operation input to an information processing apparatus.

2. Description of the Related Art

Touch input devices have been prevalent recently. A touch input device recognizes a touch operation based on X and Y coordinate values of a position where an input unit such as a touch panel is touched with an operation object such as a user's finger and a stylus, and performs various types of processing according to the touch operation. One of the known types of touch operations is a flick (an operation of releasing a touching finger as if flicking the surface of the touch panel). A flick input is known to be associated with functions such as scrolling a display image displayed on a display unit according to the speed and direction of the flick, and switching display images in order. To increase the amount of scroll or repeat switching display images, the user inputs a flick a plurality of times in succession.

Japanese Patent Application Laid-Open No. 2012-168890 discusses that the amount of scroll of a display image for a single flick operation is increased if a flick is repeatedly input within a certain period of time.

A user who is repeatedly inputting a flick tends to input subsequent flicks roughly, in which case a criterion for a touch operation to be identified as a flick may fail to be satisfied. If the criterion is not satisfied, no processing according to a flick will be performed despite the user's input intended to flick. The user may take it as a malfunction.

SUMMARY OF THE INVENTION

According to an aspect of the present disclosure, an information processing apparatus configured to perform processing according to a type of an input operation, includes a determination unit configured to determine whether a same type of operation as an operation input immediately before is likely to be repeated, based on input information of interest and information about the operation input immediately before, an identification unit configured to identify the input operation based on the information of interest according to that the information of interest satisfies a predetermined condition set in advance, and a setting unit configured to, if the determination unit determines that the same type of operation as the operation input immediately before is likely to be repeated, set a condition for the identification unit to identify the input operation based on the information of interest as the same type of operation as the operation input immediately before so that the set condition is easier to be satisfied than the predetermined condition.

Further features of the present disclosure will become apparent from the following description of exemplary embodiments with reference to the attached drawings.

BRIEF DESCRIPTION OF THE DRAWINGS

FIGS. 1A and 1B are diagrams illustrating an example of a hardware configuration and a functional configuration of an information processing apparatus.

FIG. 3 is a flowchart illustrating an example of processing for determining repetition of a single-touch operation.

FIGS. 9A, 9B, 9C, and 9D are tables illustrating examples of correspondence between the number of repetitions of an operation and a reference value of respective operation types.

DESCRIPTION OF THE EMBODIMENTS

Figure 1A:
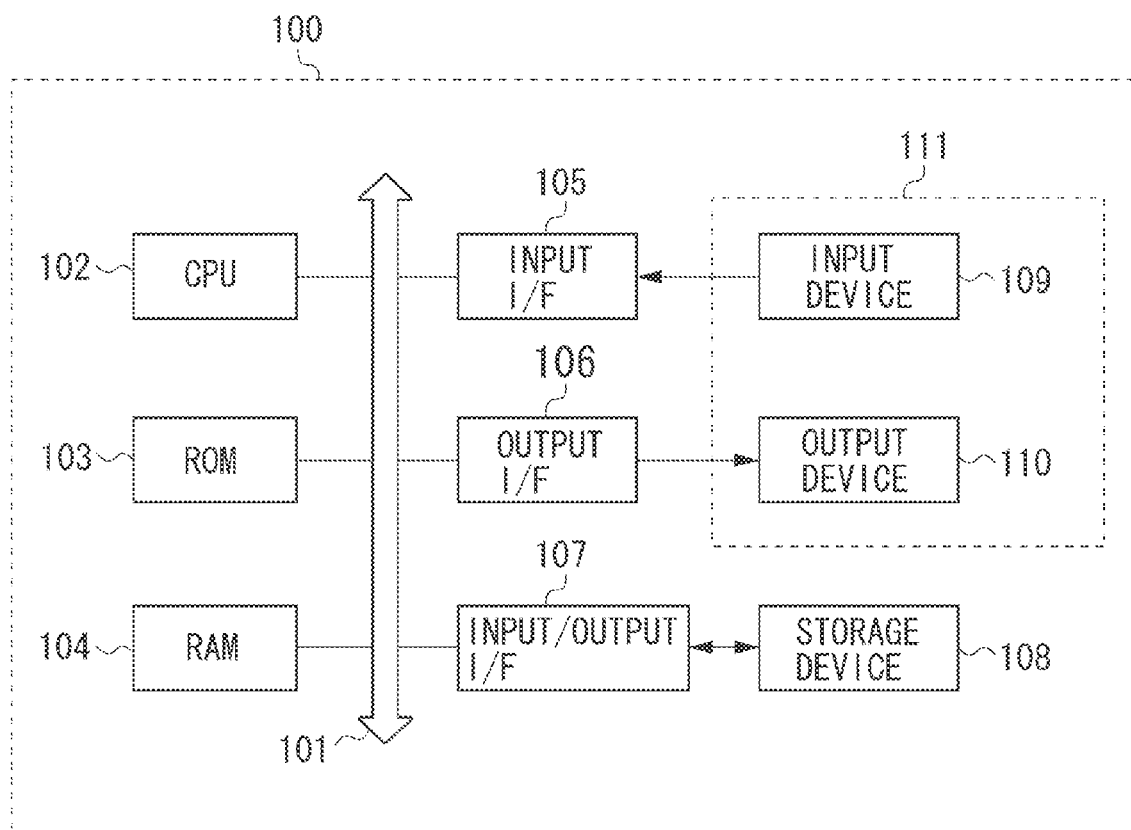

Various exemplary embodiments, features, and aspects of the disclosure will be described in detail below with reference to the drawings. It should be noted that the following exemplary embodiments are not intended to limit the present disclosure, but provide specific examples of embodiment of the present disclosure.

A first exemplary embodiment deals with an example where a touch operation, of which an operation type is identified based on whether input information exceeds a certain reference value, is determined to be likely to be repeatedly input to an information processing apparatus 100 capable of recognizing a touch operation before the type of the touch operation is identified. In particular, the first exemplary embodiment assumes a case where a single-touch operation made by a user moving a finger while touching a point on an input area (the surface of a touch panel) with the finger is repeated. Examples of a single-touch operation of which the operation type is identified based on whether input information exceeds a certain reference value include a flick. A flick is often identified based on that the amount of movement per unit time of a touch position exceeds a predetermined value. The amount of movement per unit time is obtained based on the distance over which the user moves the touch position from when the user touches the touch panel with a finger to when the user releases the finger.

An example of a hardware configuration of the information processing apparatus 100 according to an exemplary embodiment of the present disclosure will be described with reference to FIG. 1A. The information processing apparatus 100 includes a bus 101, a central processing unit (CPU) 102, a read-only memory (ROM) 103, a random access memory (RAM) 104, an input interface (I/F) 105, an output I/F 106, an input/output I/F 107, a touch panel display 111, and a storage device 108. As used herein, the term "unit" generally refers to any combination of software, firmware, hardware, or other component that is used to effectuate a purpose.

The CPU 102 performs calculations and makes logical determinations for various types of processing, and controls the components connected to the bus 101. Memories including a program memory and a data memory are mounted on the information processing apparatus 100.

The ROM 103 is a program memory. The ROM 103 stores a control program used for the control by the CPU 102, including various processing procedures illustrated in flowcharts to be described below.

The RAM 104 includes a work area of the program of the CPU 102, a save area of data during error processing, and a load area of the program. The control program may be loaded from the storage device 108 to the RAM 104, whereby a program memory may be implemented.

The input I/F 105 controls an input device 109 such as a pointing device, and obtains a signal output from the input device 109. Examples of usable pointing devices include a mouse, a track ball, and a touch panel. Other examples include a system that detects a three-dimensional position of an object to be detected by using various sensors.

The output I/F 106 outputs a signal for controlling an output of a result obtained by performing various types of processing to be described below to an output device 110. The output device 110 includes a display output unit such as a liquid crystal display, a television monitor, and a liquid crystal projector.

In the present exemplary embodiment, the touch panel display 111 integrated with the information processing apparatus 100 is used as a touch panel serving as the input device 109 and a display device serving as the output device 110. The input device 109 and the output device 110 each may be an independent external device connected to the information processing apparatus 100. The touch panel serving as the input device 109 used in the present exemplary embodiment notifies the information processing apparatus 100 of a signal as a touch event indicating that a user is touching or that a touch-released point is detected. The input I/F 105 obtains touch events point by point that are successively detected by scanning a touch-detecting area. The touch panel display 111 used in the present exemplary embodiment notifies the information processing apparatus 100 of "TOUCH" as a touch event when a touch is detected, and of "RELEASE" as a touch event when a touch having been detected is released. The touch panel is a capacitive touch panel. The touch panel identifies the coordinates of a point on a contact surface between the user and the panel surface as a touch position, and notifies the information processing apparatus 100 of the coordinates along with the touch event. Note that the touch panel is not limited to a capacitive type.

The storage device 108 connected via the input/output I/F 107 is a storage device for storing the data and programs according to the present exemplary embodiment. Examples of the storage device 108 include a hard disk drive. The storage device 108 may be configured as an external storage device connected outside. For example, the storage device 108 can be implemented by a medium (recording medium) and an external storage drive for accessing the medium. Conventional examples of such a medium include a flexible disk (FD), a compact disc read-only memory (CD-ROM), a digital versatile disk (DVD), a universal serial bus (USB) memory, a magneto-optical (MO) disk, and a flash memory. The storage device 108 may be a network-connected sever apparatus. Information needed in the present exemplary embodiment is stored in the RAM 104 and/or the storage device 108.

Hereinafter, elements and components described by referring to previously described drawings will be designated by the same reference numerals unless otherwise specified. Thus, descriptions thereof will be omitted.

FIG. 1B is a block diagram illustrating an example of a functional configuration of the information processing apparatus 100. The information processing apparatus 100 includes a detection unit 121, a determination unit 122, an acquisition unit 123, a condition setting unit 124, an identification unit 125, an area setting unit 126, a storage unit 127, and a display control unit 128. Such functional units are implemented by the CPU 102 loading a program or programs stored in the ROM 103 into the RAM 104 and performing processing according to the flowcharts to be described below. If, for example, the software processing using the CPU 102 is replaced with a hardware configuration, the hardware configuration may include arithmetic units and/or circuits corresponding to the processing of the respective functional units described below.

The detection unit 121 includes the input I/F 105, the CPU 102, the ROM 103, and the RAM 104. The detection unit 121 detects a signal output from the input device 109 at predetermined time intervals. In the present exemplary embodiment, the detection unit 121 repeats detections at intervals of 20 ms. In the present exemplary embodiment, the detected signal includes information about a touch event and information indicating a position input by the user. The information indicated by the signal detected by the detection unit 121 will hereinafter be referred to as "information of interest". The detection unit 121 stores both information indicating the detected position and time when the position input is detected (detection time) in association with an identifier (ID) of a touch position. An ID can be used to identify the same touch position. Each time the detection unit 121 obtains information about a touch position having the same ID, the detection unit 121 sequentially updates the information of interest stored in the RAM 104. IDs are associated with the order of detection of touch positions to facilitate management when a plurality of touch positions is detected. The detection unit 121 stores the information of interest in the RAM 104 and updates the information of interest when needed.

The determination unit 122 includes the CPU 102, the ROM 103, and the RAM 104. The determination unit 122 determines whether the same type of operation as an operation input immediately before is likely to be repeated, based on the information of interest detected by the detection unit 121 and information about the operation input immediately before. The "operation input immediately before" refers to an operation at that point of time at which an operation type is identified last. If information about a new touch position is detected within a predetermined time after the type of the operation input immediately before is identified, and the new touch position detected falls within a specific range, the determination unit 122 of the present exemplary embodiment determines that the same type of operation is likely to be repeated. As employed herein, the "specific range" refers to a partial range that includes the touch position at which the input of the operation input immediately before is started. The area setting unit 126 sets the partial range as a specific range where the same type of operation is likely to be input on the input area of the touch panel. Such a specific range will hereinafter be referred to as an "input start area". The determination unit 122 may add an additional determination criterion or criteria according to operation types to be distinguished.

The acquisition unit 123 includes the CPU 102, the ROM 103, and the RAM 104. The acquisition unit 123 obtains information about a movement of the touch position based on the information of interest detected by the detection unit 121. Examples of the information about the movement include a moving distance from when the user moves a finger while touching the touch panel display 111 to when the user moves the finger away from the touch panel display 111. Another example is the amount of movement per unit time that is derived from the moving distance of the touch position. As employed herein, the operation that the user moves a finger away from the touch panel display 111 will be referred to as "to release". The acquisition unit 123 notifies the identification unit 125 of the obtained information.

The condition setting unit 124 includes the CPU 102, the ROM 103, and the RAM 104. If the determination unit 122 determines that the same type of operation as that input immediately before is likely to be repeated, the condition setting unit 124 sets a condition for identifying the type of the input operation. At that time, the condition setting unit 124 sets a condition easier to be satisfied than a predetermined condition set for each operation type in advance. In the present exemplary embodiment, an "operation type" refers to the type of a touch operation stored in advance in association with processing that the information processing apparatus 100 can perform. The information processing apparatus 100 performs processing according to the type of the input operation. In the present exemplary embodiment, a condition for identifying an operation type is that a value indicated by the information obtained by the acquisition unit 123 exceeds a predetermined reference value set for each operation type. In the present exemplary embodiment, the identification unit 125 to be described below stores information indicating the type of the input operation in the RAM 104 when the type of the input operation is identified. The condition setting unit 124 then refers to the stored information to determine the reference value to be set corresponding to the type of operation. For example, a predetermined condition set for a flick is that the amount of movement per unit time based on the moving distance of the touch position up to a touch-up exceeds a predetermined reference value. The amount of movement per unit time may be replaced with a moving speed. If the same type of operation as that input immediately before is determined to be likely to be repeated, the condition setting unit 124 refers to the information stored in the storage unit 127 to obtain the reference value adjusted to a lower value than the predetermined reference value, and sets the condition. The condition setting unit 124 notifies the identification unit 125 of the set condition, i.e., the adjusted reference value.

The identification unit 125 includes the CPU 102, the ROM 103, and the RAM 104. The identification unit 125 identifies the type of the input operation based on the information obtained by the acquisition unit 123 and the predetermined condition stored in the storage unit 127 or the condition set by the condition setting unit 124. In the present exemplary embodiment, if the determination unit 122 determines that the same type of operation as that input immediately before is likely to be repeated, the identification unit 125 identifies the type of the input operation by using the reference value set by the condition setting unit 124. If the determination unit 122 determines that the same type of operation as that input immediately before is not likely to be repeated, the identification unit 125 identifies the type of the input operation by using the condition using the predetermined reference value stored in the storage unit 127. The storage unit 127 also stores a condition or conditions set to identify other types of operations. If such a condition is satisfied, the identification unit 125 identifies that a different type of operation corresponding to the satisfied condition is input. The identification unit 125 stores information indicating the type of the operation input immediately before into the RAM 104, and notifies the display control unit 128 of the information.

The area setting unit 126 includes the CPU 102, the ROM 103, and the RAM 104. The area setting unit 126 sets the "input start area" which the determination unit 122 uses to determine whether the same type of operation as that input immediately before is likely to be repeated. In the present exemplary embodiment, the area setting unit 126 sets a range of predetermined size including the start position of the operation input immediately before as the "input start area", and notifies the determination unit 122 of the input start area.

The storage unit 127 includes the CPU 102, the ROM 103, and the RAM 104. The storage unit 127 stores information in which a plurality of types of processing that the information processing apparatus 100 can perform is respectively associated with a plurality of types of touch operations for giving instructions to perform the processing. The storage unit 127 also stores predetermined conditions for identifying the types of respective touch operations and predetermined reference values (initial values) used to determine the predetermined conditions in association with each other. The storage unit 127 further stores the values of the reference values for the condition setting unit 124 to set according to the number of repetitions when the respective types of operations are repeated.

The display control unit 128 includes the CPU 102, the ROM 103, the RAM 104, and the output I/F 107. The display control unit 128 executes processing corresponding to the type of the operation identified by the identification unit 125. The display control unit 128 generates a display image on which the result of execution is reflected, and outputs the display image to the output device 110.

Figure 2A:
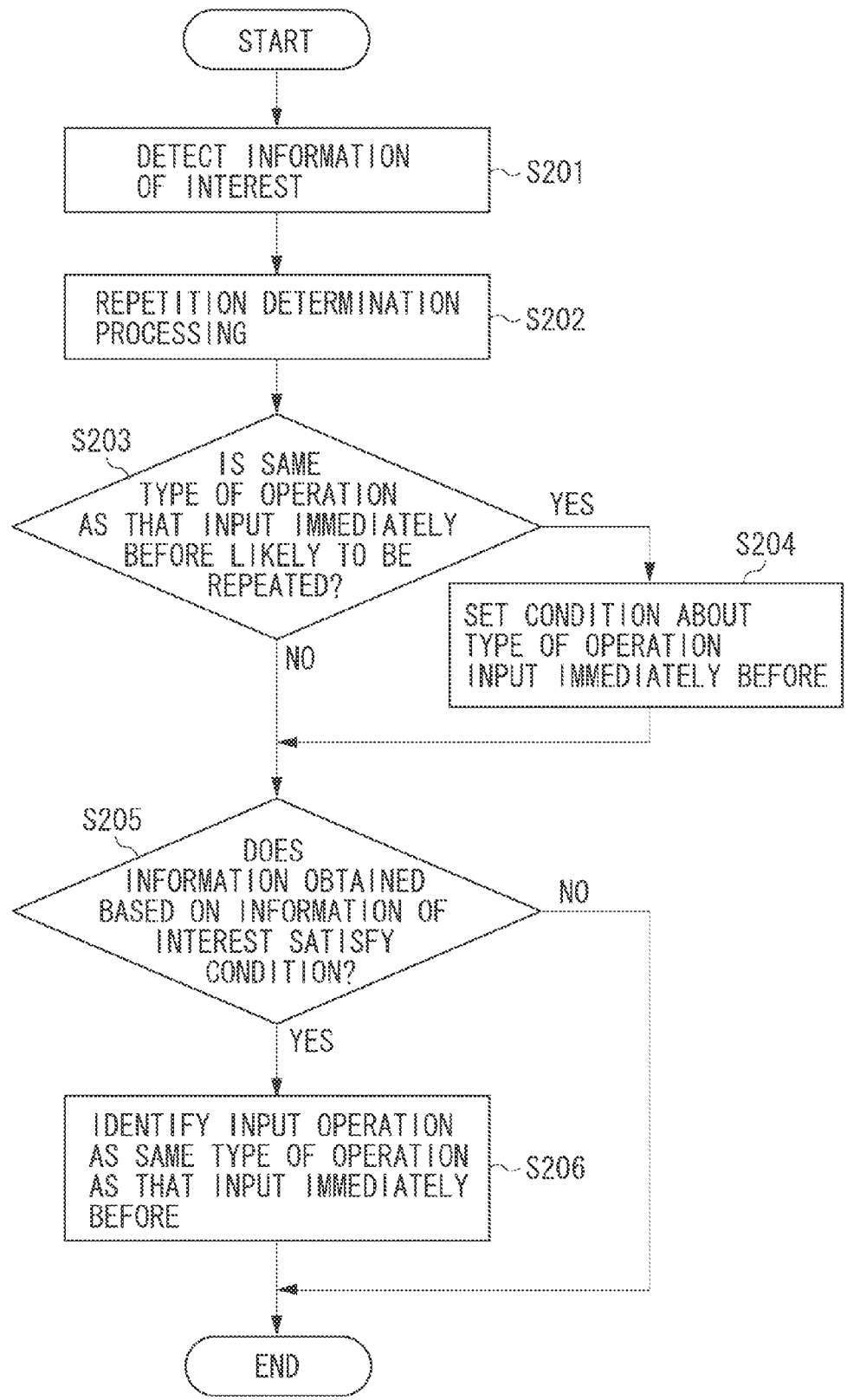
FIGS. 2A and 2B are flowcharts illustrating an example of main processing for identifying a user's operation and processing for detecting the information of interest.

FIG. 2A is a flowchart illustrating an example of main processing of the information processing apparatus 100. In the present exemplary embodiment, the flowchart of FIG. 2A is started when the information processing apparatus 100 is powered on and activated and becomes ready to accept a touch operation. The flowchart may be started when a specific application (such as an image viewer and a web browser) capable of accepting a specific touch operation such as a flick is executed.

In step S201, the detection unit 121 detects information based on the user's input. In the present exemplary embodiment, the detection unit 121 detects a touch event, information indicating the touched position (touch position), and information about the time at which the touch position is detected, based on the signal output from the touch panel display 111. In the present exemplary embodiment, the information detected when step S201 is performed is referred to as information of interest. In the present exemplary embodiment, the detection unit 121 accepts the signal from the touch panel display 111 at regular time intervals. Even when the subsequent processing steps are being performed, the detection unit 121 detects information of interest and stores information at regular time intervals. The processing of step S201 will be described in more detail below with reference to the flowchart of FIG. 2B.

In step S202, the determination unit 122 determines whether the same type of operation as that input immediately before is likely to be repeated, based on the information of interest detected by the detection unit 121 and information about the operation input immediately before. The "operation input immediately before" refers to an operation at that point of time at which an operation type is identified last. In the present exemplary embodiment, if the information of interest is input immediately after the end of the operation input immediately before and the input is considered to be started at a position where the operation input immediately before is started, the determination unit 122 determines that the same type of operation as that input immediately before is likely to be repeated. If the input is not considered as such, the determination unit 122 determines that the same type of operation as that input immediately before is not likely to be repeated. The processing of step S202 will be described in more detail below with reference to the flowchart of FIG. 3.

In step S203, the determination unit 122 determines whether the same type of operation as that input immediately before is likely to be repeated. If the same type of operation as that input immediately before is determined to be likely to be repeated (YES in step S203), the processing proceeds to step S204. If the same type of operation as that input immediately before is determined not to be likely to be repeated (NO in step S203), the processing proceeds to step S205.

In step S204, the condition setting unit 124 sets the condition about the type of operation input immediately before. In the present exemplary embodiment, the condition setting unit 124 obtains information stored in the storage unit 127 to set a condition different from the predetermined condition that is previously set to identify an input operation as that type of operation. The processing of step S204 will be described in more detail below with reference to the flowchart of FIG. 4A.

In step S205, the identification unit 125 determines whether information obtained based on the information of interest satisfies the condition for identifying the input operation as the same type of operation as that input immediately before. The identification unit 125 makes the determination based on the condition stored in the storage unit 127, if, in step S203, the same type of operation is determined not to be likely to be repeated. The identification unit 125 makes the determination based on the condition set in step S204, if, in step S203, the same type of operation is determined to be likely to be repeated. In step S205, if the condition is satisfied (YES in step S205), the processing proceeds to step S206. If the condition is not satisfied (NO in step S205), the main processing ends. If another condition stored in the storage unit 127 is satisfied after the end of the main processing, the identification unit 125 can identify the input operation as a different operation.

In step S206, the identification unit 125 identifies the operation input based on the information of interest as the same type of operation as that input immediately before. The display control unit 128 generates a display image on which the result of processing corresponding to the identified operation is reflected, and outputs the display image to the touch panel display 111. The processing of steps S205 and S206 will be described in more detail below with reference to the flowchart of FIG. 4B.

Hereinbelow, each step will be described in detail with reference to the flowcharts.

Figure 2B:
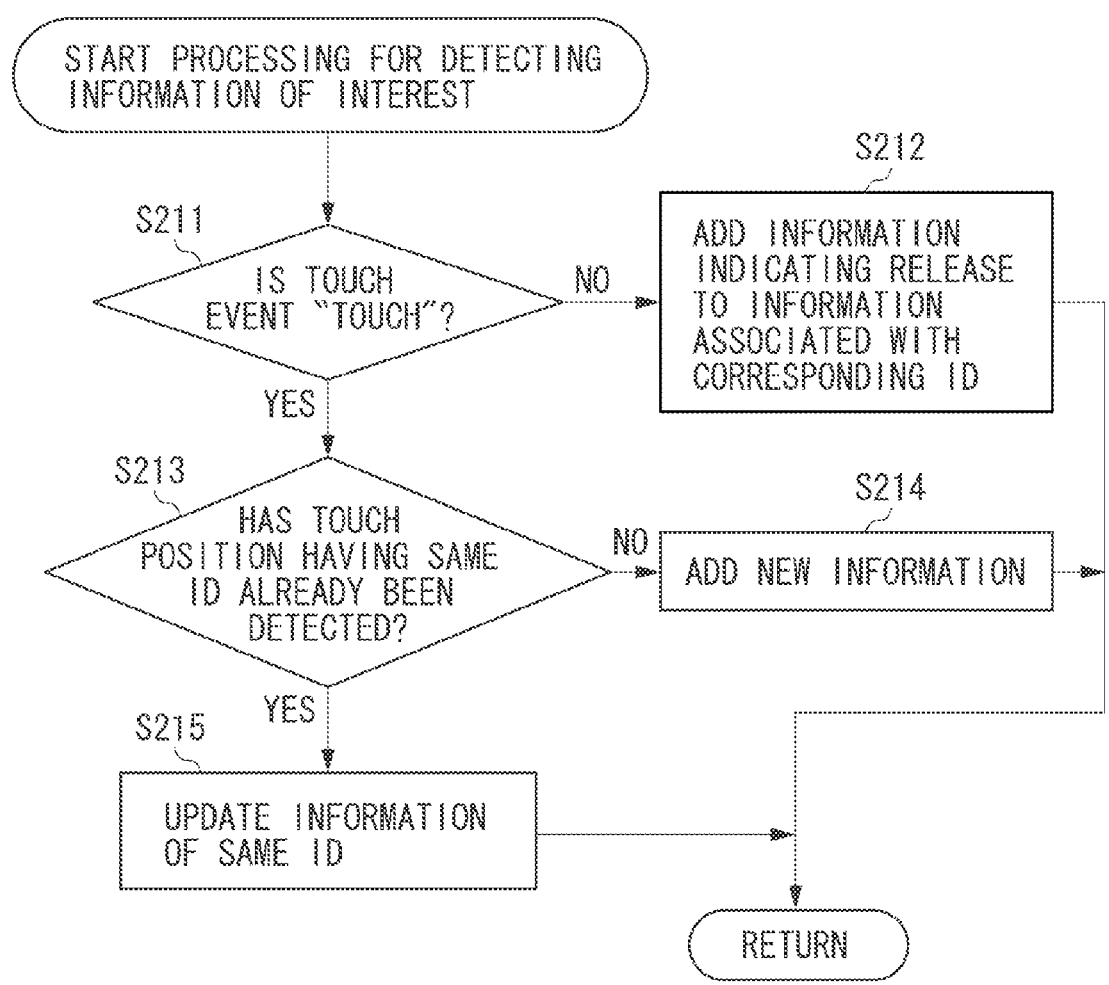

FIG. 2B is a flowchart illustrating details of the processing for detecting the information of interest, which is performed in step S201.

In step S211, the detection unit 121 determines whether the touch event notified from the touch panel is a "TOUCH". If the notified touch event is determined to be a "TOUCH" (YES in step S211), the processing proceeds to step S213. If the notified touch event is not a "TOUCH", i.e., is a "RELEASE" (NO in step S211), the processing proceeds to step S212.

In step S212, the detection unit 121 adds information indicating the release of a touch position to information associated with the ID corresponding to the touch position where the "RELEASE" is detected among the pieces of information stored in the RAM 104. For example, the detection unit 121 sets a release flag to indicate "TRUE".

In step S213, the detection unit 121 determines whether a touch position having the same ID as that of the touch position where the "TOUCH" is detected has already been detected. The detection unit 121 refers to the information stored in the RAM 104, and determines whether the corresponding ID is included. If a touch position having the same ID is determined to have already been detected (YES in step S213), the processing proceeds to step S215. If a touch position having the same ID is determined not to have been detected (NO in step S213), the processing proceeds to step S214.

In step S214, the detection unit 121 adds new information about the ID, coordinates, and detection time of the touch position where the "TOUCH" is detected to the information stored in the RAM 104. Here, the RAM 104 stores information indicating that a new touch position is detected. For example, the RAM 104 sets a new detection flag to indicate "TRUE".

In step S215, the detection unit 121 updates the information about the coordinates and detection time of the same ID as that of the touch position where the "TOUCH" is detected among the pieces of information stored in the RAM 104. Here, the detection unit 121 does not overwrite the information on which the new detection flag of "TRUE" is set, but stores the information as a separate piece of latest information about the touch position of the same ID. As the processing is subsequently repeated, the detection unit 121 overwrites the latest information to update, and returns to the processing of FIG. 2A. In the present exemplary embodiment, if a move smaller than a predetermined distance is detected, the touch position is processed as not moving, i.e., as remaining still.

The information of interest stored in the RAM 104 is initialized when the type of the touch operation based on the information of interest is identified. As will be described below, the identification unit 125 converts some of the information of interest into information about an operation input immediately before and stores the resulting information.

The present exemplary embodiment uses the touch panel 109 that notifies the detection unit 121 of a "TOUCH" as a touch event if a touch is detected, and of a "RELEASE" as a touch event if a touch position having been detected is released. However, this is not restrictive. For example, the touch panel 109 may notify the detection unit 121 of a "TOUCH_DOWN" as a touch event if a new touch is made on the input area, a "MOVE" if a movement of a touch position having an already detected ID is detected, and a "TOUCH_UP" if released. In such a case, if a "TOUCH_DOWN" is notified, the detection unit 121 stores new information in the RAM 104 and sets a new detection flag to indicate "TRUE". If a "MOVE" is notified, the detection unit 121 updates the information having the same ID. If a "TOUCH_UP" is notified, the detection unit 121 may delete the information having the same ID.

As described above, the information processing apparatus 100 uses IDs to identify a plurality of touch positions detected by the touch panel display 111 and manage information. For example, if the user simultaneously touches a plurality of positions on the input area with a plurality of fingers, the information processing apparatus 100 can assign respective different IDs to the plurality of touch positions, and detect the movement of the respective touch positions.

Next, details of repetition determination processing (single-touch operation repetition determination processing) performed in step S202 will be described with reference to the flowchart of FIG. 3. In the present exemplary embodiment, the determination unit 122 determines that the same type of operation as that input immediately before is likely to be repeated if the information of interest is input immediately after the end of the operation input immediately before and the input is considered to be started at the position where the operation input immediately before is started. The determination unit 122 can thus start the repetition determination processing at least when information about an initial touch position where a new input operation is started is detected as information of interest.

In step S301, the determination unit 122 obtains the information about the operation input immediately before. In the present exemplary embodiment, as will be described below, if the identification unit 125 identifies the type of an input operation, the identification unit 125 stores information about the identified type of the operation, the time when the type is identified, and the position where the identified operation is started as the information about the operation input immediately before. The area setting unit 126 further sets a specific range including the position where the identified operation is started as an "input start area", which is the range where the same type of operation is likely to be input. The area setting unit 126 stores information indicating the range in the RAM 104. In step S301, the determination unit 122 thus reads necessary information from the RAM 104.

In step S302, the determination unit 122 determines whether the information of interest is detected within a predetermined time after the type of the operation input immediately before is identified. The determination unit 122 makes the determination by referring to the information about the detection time included in the information of interest detected by the detection unit 121 and information about the time at which the type is identified, included in the information about the operation input immediately before obtained in step S301. In the present exemplary embodiment, for example, the predetermined time is 500 ms. In other words, the determination unit 122 determines whether the information of interest is detected within 500 ms after the time when the type of the operation input immediately before is identified. If the information of interest is determined to be detected within the predetermined time after the type of the operation input immediately before is identified (YES in step S302), the processing proceeds to step S303. If the information of interest is determined not to be detected within the predetermined time after the type of the operation input immediately before is identified (NO in step S302), the processing proceeds to step S306.

In step S303, the determination unit 122 determines whether the input is started at a position included in the set "input start area". The determination unit 122 makes the determination by referring to position information on which the new detection flag of "TRUE" is set among the pieces of information of interest detected by the detection unit 121 and the information about the "input start area" included in the information about the operation input immediately before obtained in step S301. In the present exemplary embodiment, for example, the "input start area" is the inside of a circle having a radius of 50 dots about the start position of the operation input immediately before. In other words, the determination unit 122 determines whether the touch position on which the new detection flag of "TRUE" is set falls within the circle having a radius of 50 dots about the start position of the operation input immediately before. If the input is determined to be started at a position included in the "input start area" (YES in step S303), the processing proceeds to step S304. If the input is determined not to be started at a position included in the "input start area" (NO in step S303), the processing proceeds to step S306.

In step S304, the determination unit 122 determines that the same type of operation as that input immediately before is likely to be repeated. The determination unit 122 then stores information indicating that the same type of operation as that input immediately before is likely to be repeated, i.e., the possibility for the same type of operation to be repeated is determined to be high, into the RAM 104. For example, the determination unit 122 sets a repetition determination flag to indicate "TRUE".

In step S305, the determination unit 122 increments the value of the number of repetitions stored in the RAM 104. Then, the processing returns to the main processing.

In step S306, the determination unit 122 sets the value of the number of repetitions stored in the RAM 104 to zero.

In step S307, the determination unit 122 initializes the reference value serving as the condition for identifying the input operation as the same type of operation as that input immediately before. In the present exemplary embodiment, the condition for identifying the type of an operation is that the reference value set for each operation type is exceeded. In step S307, the determination unit 122 initializes the reference value even if the same type of operation has already been repeated by that point in time and a changed reference value has been set by the processing for setting the condition in step S204 (processing for adjusting the reference value). More specifically, the determination unit 122 deletes the information set as the reference value in the RAM 104. After the completion of the processing, the processing returns to the main processing.

Next, details of condition setting processing performed in step S204 will be described with reference to the flowchart of FIG. 4A.

In step S401, the condition setting unit 124 obtains the type of the operation input immediately before. In the present exemplary embodiment, the condition setting unit 124 reads information indicating the type of the operation, which is included in the information that the identification unit 125 stores in the RAM 104 in response to the identification of the type of the input operation.

In step S402, the condition setting unit 124 sets a reference value corresponding to the type of the operation input immediately before and the number of repetitions. In the present exemplary embodiment, the storage unit 127 stores in advance information indicating values to which the reference value is to be adjusted according to the number of repetitions when each type of operation is repeated. FIG. 9A illustrates an example of information in which the number of repetitions is associated with reference values to be set for a flick operation. For example, if the number of repetitions is one, the amount of movement per unit time, or the reference value for identifying a flick, is "20". The numerical value is in units of [dots/20 ms]. In such a case, if the amount of movement per unit time of the touch position derived from the information of interest exceeds 20 dots, the type of the operation input based on the information of interest is identified as a flick. If the number of repetitions is two, the condition setting unit 124 sets the reference value to "10". If the number of repetitions is three or more, the condition setting unit 124 sets the reference value to "5". In other words, the greater the number of repetitions, the smaller the reference value for identifying a flick is so that a flick becomes easier to be identified.

The condition setting unit 124 refers to the information stored in the storage unit 127, and reads and sets the reference value corresponding to the operation type identified in step S401, and the number of repetitions counted by the processing of step S203. The condition setting unit 124 notifies the identification unit 125 of the reference value. After the completion of the processing, the processing returns to the main processing.

Next, details of flick operation identification processing performed in step S204 will be described with reference to the flowchart of FIG. 4B.

In the following description, the user is assumed to repeatedly input a flick operation as an example of a single-touch operation which the user makes by moving a finger while touching a point on the input area with the finger. In other words, the condition setting unit 124 is assumed to identify in step S401 that the operation input immediately before is a flick. However, the present exemplary embodiment is not limited to a flick operation. The present exemplary embodiment is applicable to situations where a single-touch operation whose operation type is identified based on whether input information exceeds a certain reference value is repeatedly input.

Figure 4A:
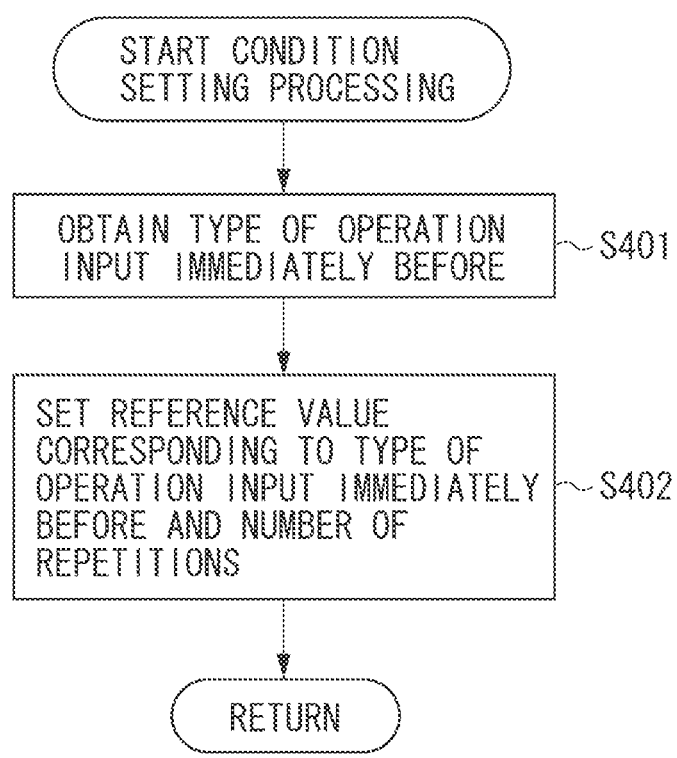
FIGS. 4A and 4B are flowcharts illustrating an example of processing for adjusting a reference value according to the number of repetitions and processing for identifying an operation type as a flick operation.
Figure 4B:
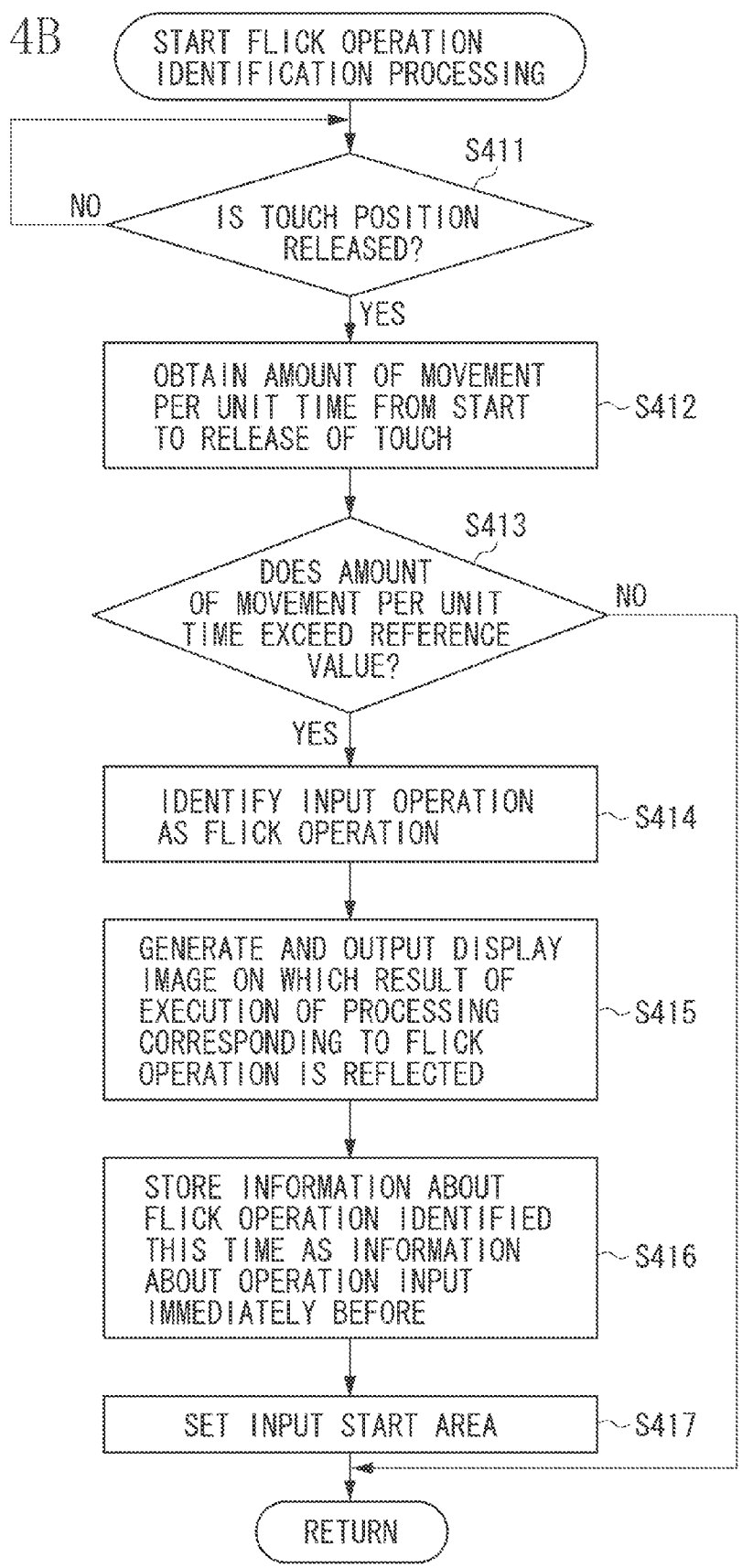

FIG. 4B illustrates an example of the flick operation identification processing performed in step S204 if the operation input immediately before is identified as a flick. In the present exemplary embodiment, the processing illustrated in the flowcharts to be used to identify respective types is stored in the storage unit 127 in advance. The processing is read and executed in response to identification of the operation input immediately before.

In step S411, the identification unit 125 determines whether the touch position is released, based on the information of interest that the detection unit 121 detects at predetermined time intervals. If the touch position is determined to be released (YES in step S411), the processing proceeds to step S412. If the touch position is determined not to be released (NO in step S411), the identification unit 125 repeats step S411 to wait for a release.

In step S412, the identification unit 125 obtains information about the movement of the last-detected touch position from the start to the release of the touch based on the information of interest stored in the RAM 104. For a flick operation, the identification unit 125 obtains information indicating the amount of movement per unit time of the touch position. In the present exemplary embodiment, the identification unit 125 initially obtains a distance between the position information on which the new detection flag of "TRUE" is set and the position information about the last-detected touch position as the moving distance of the touch position having the ID on which the release flag of "TRUE" is set. The identification unit 125 further obtains the time taken to make the input as a moving time from the detection time on which the new detection flag of "TRUE" is set and the detection time of the last-detected touch position. To simplify calculations, the moving time may be expressed in units of the predetermined time intervals at which the detection unit 121 detects the information of interest. The identification unit 125 divides the moving distance by the moving time to obtain the amount of movement of the touch position per unit time.

In step S413, the identification unit 125 determines whether the obtained amount of movement per unit time from the start to the release of the touch exceeds a reference value. If the condition setting unit 124 has not set a reference value in step S402, the identification unit 125 reads and uses the predetermined reference value stored in the storage unit 127. If the condition setting unit 124 has set a reference value in step S402, the identification unit 125 uses the notified reference value. If the amount of movement per unit time is determined to exceed the reference value (YES in step S413), the processing proceeds to step S414. If the amount of movement per unit time is determined not to exceed the reference value (NO in step S413), the processing returns to the main processing. Then, the main processing ends.

In step S414, the identification unit 125 identifies the operation input based on the information of interest as a flick operation.

In step S415, the display control unit 128 generates a display image on which a result of execution of processing corresponding to the flick operation is reflected, and outputs the display image to the output device 110. The display control unit 128 performs processing like scrolling a display image or switching display images according to the flick operation, and provides feedback to the user. The display control unit 128 identifies the direction and the amount of operation of the flick by using the information of interest stored in the RAM 104 by the detection unit 121, and reflects the direction and the amount of operation on the output.

In step S416, the identification unit 125 stores information about the flick operation identified this time into the RAM 104 as information about an operation input immediately before. In the present exemplary embodiment, the identification unit 125 stores information about the identified type of the operation, the time when the type is identified, and the position where the identified operation is started as the information about the operation input immediately before.

In step S417, the area setting unit 126 sets an "input start area", which is the specific range where the same type of operation as that identified this time is likely to be input, on the input area of the touch panel display 111. Specifically, the area setting unit 126 obtains position information on which the new detection flag of "TRUE" is set among the pieces of information of interest stored in the RAM 104, and identifies a range including that position. For example, the area setting unit 126 sets a circle having a radius of 50 dots about the obtained touch position as the "input start area". The area setting unit 126 then initializes the information of interest that has been stored in the RAM 104 by the detection unit 121.

Figure 10A:
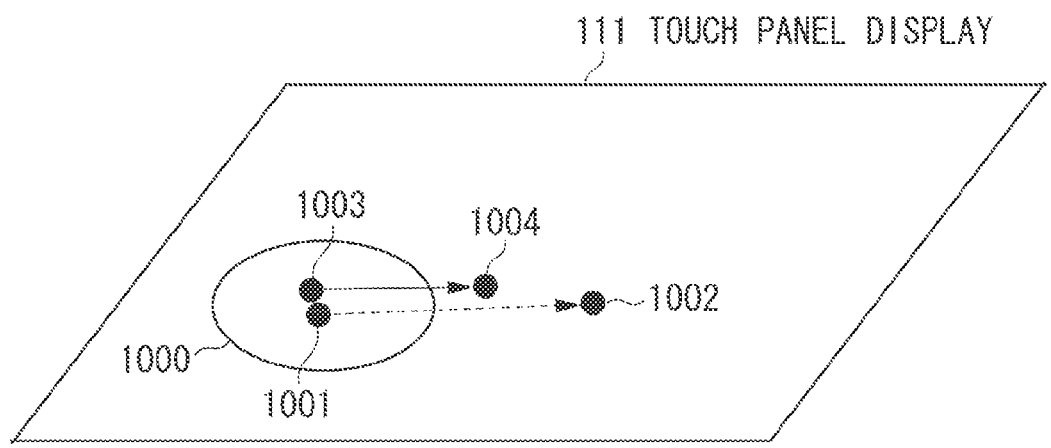
FIGS. 10A, 10B, 10C, and 10D are diagrams illustrating examples where a flick operation is determined to be repeated based on detected touch positions.
Figure 10B:
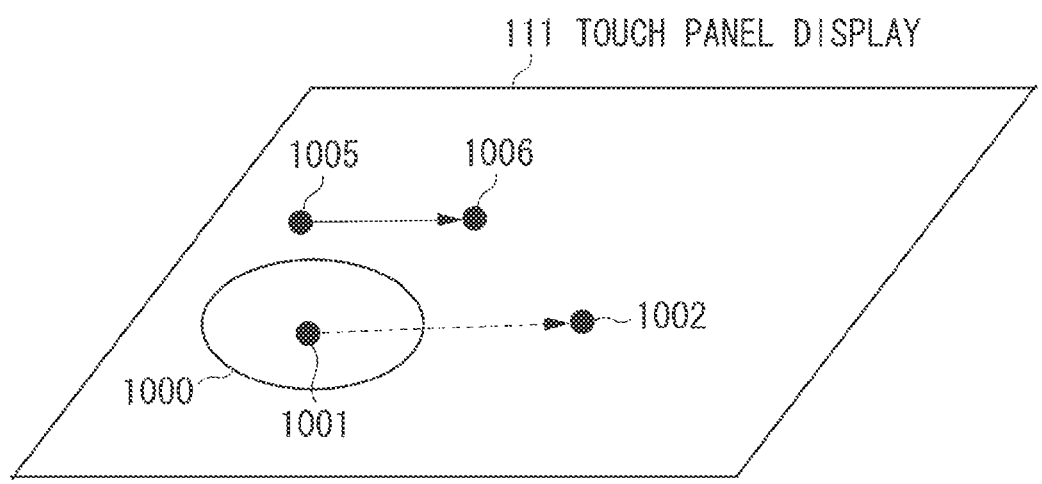

Now, specific examples of an "input start area" which is set based on information about a position where the operation input immediately before is started will be described with reference to FIGS. 10A, 10B, 10C, and 10D. In FIG. 10A, an area 1000 represents an "input start area" which is set based on an input start position when the operation input immediately before is a flick. The range of the "input start area" is inside the circle having a radius of 50 dots about a start position 1001 of the flick operation input immediately before. Alternatively, the input start area may be set, for example, to range between ±50 dots both in X and Y coordinates with respect to the start position 1001 of the flick operation input immediately before. While the numerical value of 50 dots is employed in the present exemplary embodiment, the value may be arbitrarily changed. The size of the "input start area" may be determined based on the size of the touch panel display 111. In FIG. 10A, a start position 1003 of the current operation input based on the information of interest is included in the area 1000. The possibility for the same type of operation to be repeated is thus considered to be high (YES in step S203). In FIG. 10B, a start position 1003 of the current operation input based on the information of interest lies outside the area 1000. In such a case, in the present exemplary embodiment, the possibility for the same type of operation to be repeated is considered to be low. The same type of operation is thus determined not to be likely to be repeated (NO in step S203).

Described above is the processing for determining whether a touch operation, whose operation type is identified based on whether input information exceeds a certain reference value, is likely to be repeated before identifying the type of the touch operation according to the present exemplary embodiment.

In the present exemplary embodiment, the reference value is changed stepwise according to the number of repetitions. However, this is just an example and not a requirement. For example, the condition setting unit 124 may adjust the reference value for identifying a flick according to the time elapsed from when a flick is identified last time to when the next input is started. In such a case, the condition setting unit 124 adjusts the reference value for identifying a flick to a smaller value, considering that the shorter the elapsed time from the previous identification, the higher the possibility for a flick to be made again the next time.

The determination unit 122 according to the present exemplary embodiment makes a determination in two stages, including the processing for determining whether the next input is started immediately after the type of the operation input immediately before is identified, and the processing for determining whether the next input is started at the input start area. However, the processing for determining whether a new operation input is started within the input start area can be omitted. In general, a user who is repeating the same type of operation tends to make rough inputs. A likely reason is that the user quickly moves the finger due to short intervals between the operations. The problem that the repetition of operations invites the user's rough inputs with insufficient amounts of movement of the touch positions can be solved by performing at least the processing for determining whether the next input is started immediately after the type of the operation input immediately before is identified. However, the processing for determining whether the next input is started within the input start area can be added to enable a more precise determination. The reason is that the possibility for the same type of operation to be repeated is considered to be high if the user returns the finger to the start position of the previous operation immediately after the previous operation.

The first exemplary embodiment has been described by using the repetition of a flick operation as an example. Among single-touch operations, the flick operation is particularly likely to be input repeatedly. The present exemplary embodiment may be modified to be applied only to such problematic operations in particular. For example, the repetition determination processing may include additional determination steps appropriate for respective operation types. For example, flick operations can be associated with display commands of different types of processing depending on the input direction. In such a case, step S303 may be followed by an additional processing step in which the determination unit 122 obtains the direction of the input operation, and determines whether the input is generally in the same direction as the input direction of the operation input immediately before. This can make a distinction, for example, between rightward and leftward flicks to more accurately determine whether the same type of operation as that input immediately before is repeated. However, in order to calculate the input direction of a new input operation based on the information of interest, position information about at least two points needs to have been detected.

For example, as illustrated in FIG. 10A described above, the determination unit 122 determines whether an angular difference between the direction of the flick operation input immediately before from the position 1001 to a position 1002 and the direction of the operation input based on the information of interest from the position 1003 to a position 1004 is smaller than or equal to a predetermined angle. Suppose that the predetermined angle is 45°. If the angular difference is smaller than or equal to 45°, the processing proceeds to step S304 where the determination unit 122 determines that the same type of operation as that input immediately before is likely to be repeated. If the angular difference exceeds 45°, the processing proceeds to step S307. The determination unit 122 calculates the input direction by using coordinate information about two touch positions included in the information of interest and an arctangent. Suppose that the user touches the touch panel display 111 at coordinates (X1, Y1) and releases at coordinates (X2, Y2). The determination unit 122 calculates $\tan \theta = (Y2-Y1)/(X2-X1)$, and then calculates the input direction $\theta$. If (Y2−Y1) has a negative value, the determination unit 122 adds 180° to the input direction since the user operation is made in a negative direction with respect to the Y-axis.

Figure 10C:
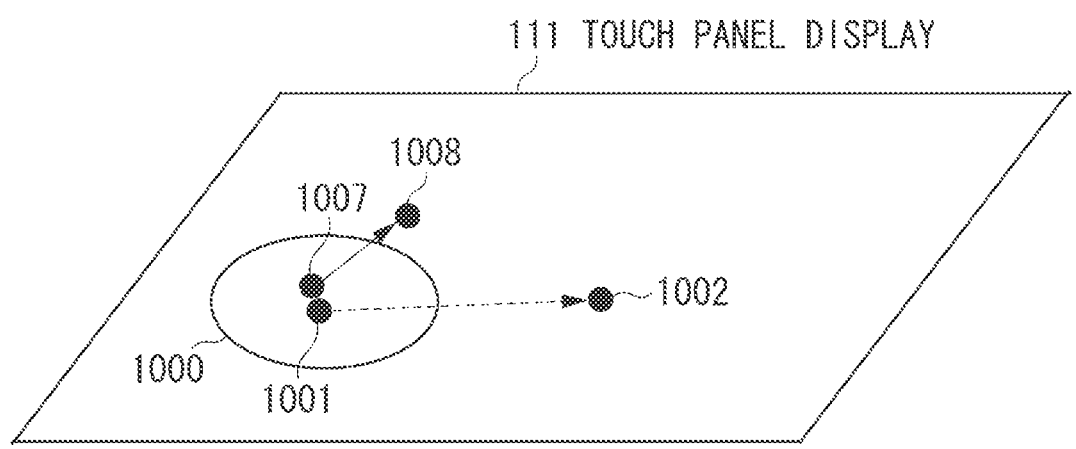

A specific example of the calculation of the input direction will be described referring to FIG. 10A as an example. FIG. 10A is a diagram illustrating an example of a user operation. The position 1003 represents the start position of an input, and the position 1004 represents the end position. For example, if the position 1003 is at coordinates (100,500) and the position 1004 is at coordinates (300,500), $\tan \theta = (500-500)/(300-100)=0$ and $\theta=0°$. Then, the input direction is determined to be 0°. FIG. 10C illustrates a case where the input is not made within 45°. A position 1007 represents the start position of the input, and a position 1008 represents the end position. For example, if the position 1007 is at coordinates (100,500) and the position 1008 is at coordinates (200, 800), $\tan \theta = (800-500)/(200-100)=3$ and $\theta=71°$. That is, the input direction is 71°. The input direction of the previous flick from the position 1001 to the position 1002 is 0°. Since the input direction of 71° exceeds 45° with respect to the direction of the previous flick of 0°, the determination unit 122 determines that the input is not in the same direction.

As described above, some operation types need a further distinction, like similar flicks in different directions. Appropriate determination processing for such operation types can be added to enable a more precise determination.

The present exemplary embodiment has dealt with the case where the determination unit 122 determines whether the same type of operation is likely to be repeated, by using the detection time of the start of an operation, the input start position, and the input direction. Using the detection time of the start of the operation and the input start position, the determination unit 122 can immediately perform the repetition determination processing when new information of interest is obtained. However, the determination method is not limited thereto. For example, the determination unit 122 may consider the possibility for the same type of operation to be repeated to be high if a difference in input speed from the operation input immediately before falls within a predetermined range. The determination unit 122 may obtain the start time of an operation prior to that input immediately before, and consider the possibility for the same type of operation to be repeated to be high if the inputs are started at regular time intervals.

As described above, in the first exemplary embodiment, if the possibility for the same type of operation as that input immediately before to be repeatedly input is considered to be high, the information processing apparatus 100 changes the condition for identifying the same type of operation as that input immediately before. This makes it easier for an input operation to be identified as the same type of operation as that input immediately before than when the possibility for the same type of operation to be repeatedly input is considered to be low. The user may make rough inputs with insufficient amounts of movement as the user repeats operations. Even in such a case, the operations are more likely to be recognized as intended by the user. In other words, malfunctions to the user can be reduced. In particular, according to the present exemplary embodiment, the information processing apparatus 100 changes the strictness of the condition (the magnitude of the reference value) according to the number of times the same type of operation has been repeated. As the number of repetitions increases and inputs tend to be rougher, an input operation becomes more likely to be identified as the same type of operation as that input immediately before. If the condition for identifying the same type of operation as that input immediately before is not satisfied, the information processing apparatus 100 performs processing corresponding to various operations other than that input immediately before, provided that predetermined conditions for identifying the input of the ordinary other operations are satisfied.

Next, modifications applicable to the present exemplary embodiment will be described.

In the first exemplary embodiment, the information processing apparatus 100 changes the reference value for a next input operation to be identified as the same type of operation as that input immediately before according to the number of times the same type of operation has been repeated.

In a first modification, the information processing apparatus 100 identifies the operation type if the number of repetitions exceeds a certain number of times. In other words, the information processing apparatus 100 starts to perform the processing corresponding to the same type of operation as that input immediately before at the point of time when the same type of operation is determined to be likely to be repeated. Like the first exemplary embodiment, the first modification will be described below by using an example where the user repeats a flick operation.

In the first modification, the information processing apparatus 100 has a hardware configuration similar to that of FIG. 1A according to the first exemplary embodiment. The functional configuration of the information processing apparatus 100 is also similar except the processing of the determination unit 122 and the determination unit 125. The following description deals only with differences.

The determination unit 122 of the first modification performs the processing according to the first exemplary embodiment. In addition thereto, if the same type of operation as that input immediately before is determined to be likely to be repeated, the determination unit 122 further determines whether the number of repetitions of the same type of operation is greater than or equal to a predetermined number of times. If the number of repetitions is greater than or equal to the predetermined number of times, the determination unit 122 notifies the identification unit 125 that the number of repetitions of the same type of operation is greater than or equal to the predetermined number of times.

If the identification unit 125 of the first modification is notified by the determination unit 122 that the number of repetitions of the same type of operation is greater than or equal to the predetermined number of times, the identification unit 125 identifies the input operation as the same type of operation as that immediately before, omitting the determination whether information obtained based on the information of interest satisfies a condition.

Like the first exemplary embodiment, the information processing apparatus 100 of the first modification basically performs the main processing according to the flowchart of FIG. 2A.

The repetition determination processing (step S202) includes additional processing in which the determination unit 122, after incrementing the number of repetitions, determines whether the number of repetitions of the same type of operation is greater than or equal to the predetermined number of times. If the number of repetitions is determined to be greater than or equal to the predetermined number of times, the determination unit 122 sets a multiple succession flag of "TRUE" on the RAM 104. The processing then returns to the main processing. The identification unit 125 can refer to the multiple succession flag to obtain the determination result. If the number of repetitions is determined not to be greater than or equal to the predetermined number of times, the processing simply returns to the main processing.

Before obtaining the information about the movement of the touch position in step S412, the identification unit 125 refers to the RAM 104 and determines whether the multiple succession flag is "true". If the multiple succession flag is "TRUE", then in step S414, the identification unit 125 determines that the input operation is a flick operation, omitting the processing of steps S412 and S413. The subsequent processing is similar to that of the first exemplary embodiment.

For example, suppose that the predetermined number of repetitions is four, and the user has already repeated a flick four times. According to the first modification, the identification unit 125 then identifies the input of the fifth and subsequent flicks as soon as the user touches near the start position of the previous flick immediately after the end of the previous flick. However, while the determination unit 122 here determines whether the number of repetitions is greater than or equal to four, this is just an example and not a requirement.

According to the first modification, if the same type of operation has been repeated many times, the information processing apparatus 100 provides feedback when the user starts a touch. For example, if the user repeats a flick, the user eventually can just tap (touch and release the touch panel without a move) to obtain the same result as with a flick. This allows easier operations. The user can thus obtain a desired result more quickly.

In the first exemplary embodiment, the information processing apparatus 100 sets the "input start area" based the position where the operation input immediately before is started, and determines whether a new operation input is started at a position included in the "input start area". If rightward and leftward flicks need to be distinguished, the information processing apparatus 100 determines whether the input directions are similar, as a determination factor for determining whether the same type of operation is likely to be repeated.

In a second modification, the information processing apparatus 100 sets the "input start area" based on the position where the operation input immediately before is ended, and determines whether a new operation input is started at a position included in the "input start area". The reason is that the user tends to start a next operation at the position where the previous operation ends, in situations where the user repeats operations of opposite directions alternately. Like the first exemplary embodiment, the second modification will be described below by using an example where the user repeats flick operations.

In the second modification, the information processing apparatus 100 has a hardware configuration similar to that of FIG. 1A according to the first exemplary embodiment. The functional configuration of the information processing apparatus 100 is also similar except the processing of the area setting unit 126. The following description deals only with differences.

After the identification unit 125 identifies the type of the operation input based on the information of interest, the area setting unit 126 of the second modification sets a specific range including the position where the operation is ended as an "input start area". Specifically, the area setting unit 126 identifies the range including the last-detected touch position in the information of interest stored in the RAM 104.

The information processing apparatus 100 of the second modification performs similar processing to that of the flowcharts described in the first exemplary embodiment. A description thereof will thus be omitted.

Figure 10D:
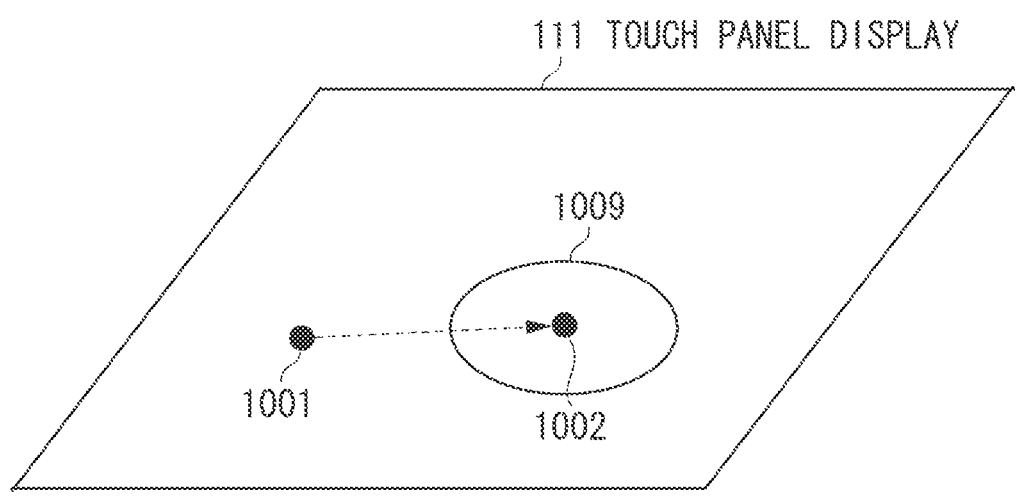

A specific example of the "input start area" according to the second modification will be described with reference to FIG. 10D. Like FIGS. 10A, 10B, and 10C, positions 1001 and 1002 of FIG. 10D represent the start position and end position of a flick input immediately before. An area 1009 represents the "input start area" set by the area setting unit 126 of the second modification. The "input start area" of the second modification is an area illustrated by a circle having a radius of 50 dots about the position 1002 that is the end position of the flick input immediately before (position where the user's finger is released). Like the first exemplary embodiment, the input start area is set to a circular range having a radius of 50 dots, whereas this is not restrictive. For example, the input start area may be set to range between ±50 dots both in X and Y coordinates with respect to the end coordinates. While the numerical value of 50 dots is employed in this modification, the value may be arbitrarily changed. The size of the "input start area" may be determined based on the size of the touch panel display 111.

As describe above, according to the second modification, the information processing apparatus 100 determines whether the same type of operation is likely to be repeated in situations where the user repeatedly inputs operations of opposite directions alternately. The information processing apparatus 100 therefore sets the "input start area" based on the end position of the operation input immediately before. However, the use of the end position of the operation input immediately before is just an example. For example, like the first exemplary embodiment, the information processing apparatus 100 may determine the "input start area" based on the start position of the operation input immediately before, and perform processing for extending the "input start area" in an operation direction of the operation input immediately before. The information processing apparatus 100 may change the size of the range to be extended and/or the size of the initially set area according to the speed of the operation.

The user may make rough inputs with insufficient amounts of movement as The user repeats operations of opposite directions alternately. According to the second modification, even such operations are likely to be recognized as intended.

In the first exemplary embodiment, the "input start area" is set by using the start position of the operation input immediately before. In the second modification of the first exemplary embodiment, the "input start area" is set by using the end position of the operation input immediately before. The position information serving as a reference for setting the "input start area" is not limited thereto. In a third modification, for example, the information processing apparatus 100 may set the "input start area" based on average coordinates of the positions where the same type of operations repeatedly input are started. In another example, the information processing apparatus 100 may set the "input start area" based on a difference between the input start positions of two successive operations.

For example, when the contents of the display image are changed by scrolling, some part of the display image may become unavailable to start a touch input for flicking, depending on the contents of the display image (for example, hyperlink positions of a browser). In the third modification, the information processing apparatus 100 sets the "input start area" by using information about operations that have already been repeated several times. Consequently, even if the user changes the position to start an operation, the information processing apparatus 100 can make a determination by absorbing such an error.

A second exemplary embodiment will be described. The second exemplary embodiment also deals with an example where a touch operation, whose operation type is identified based on whether input information exceeds a certain reference value, is determined to be likely to be repeatedly input to an information processing apparatus 100 capable of recognizing a touch operation before the type of the touch operation is identified. The second exemplary embodiment takes into account the case where the user repeats multi-touch operations aside from single-touch operations. A multi-touch operation refers to an operation that the user makes by moving fingers while simultaneously touching a plurality of points on the input area with the fingers. Examples of a multi-touch operation whose operation type is identified based on whether input information exceeds a certain reference value include a multi-drag, a pinch, and a rotate. A multi-drag is identified by that two touch positions are simultaneously moved in parallel (two touch positions are moved in similar directions while maintaining a constant distance therebetween) over a moving distance more than a predetermined reference value. For example, a multi-drag is used as an instruction operation for processing for changing a display image displayed on the touch panel display 111 to a specific image. A pinch is identified by that the amount of change of the distance between two touch positions exceeds a predetermined reference value. For example, a pinch is used as an instruction operation for processing for enlarging (or reducing) a display image displayed on the touch panel display 111 according to the amount of change of the distance between the two touch positions. A rotate is identified by that the amount of change in the angle formed by a line joining two touch positions before and after the movement of the touch positions exceeds a predetermined reference value. For example, a rotate is used as an instruction operation for processing for rotating a display image displayed on the touch panel display 111 according to the amount of change of the angle. The second exemplary embodiment addresses the problem that the user may make rough inputs with insufficient amounts of movement of touch positions as he/she repeatedly inputs a multi-touch operation. In the second exemplary embodiment, if the same type of multi-touch operation is determined to be likely to be repeated, the information processing apparatus 100 changes a condition and identifies the type of the operation.

The information processing apparatus 100 according to the second exemplary embodiment has a hardware configuration similar to that of FIG. 1A according to the first exemplary embodiment. However, the touch panel display 111 can simultaneously detect the input of a plurality of touch positions. The touch panel display identifies a plurality of touches by using IDs as described above.

The functional configuration of the information processing apparatus 100 according to the second exemplary embodiment is also similar except the processing of the determination unit 122 and the area setting unit 126. The following description deals only with differences.

Like the first exemplary embodiment, the determination unit 122 according to the second exemplary embodiment makes a determination in two stages, including the processing for determining whether the next input is started immediately after the type of the operation input immediately before is identified and the processing for determining whether the next input is started at an input start area. If the operation input immediately before is a multi-touch operation, the processing for determining whether the next input is started at an input start area includes determining whether each of a plurality of set "input start areas" includes at least one start position of the next input.

If the type of an input multi-touch operation is identified by the identification unit 125, the area setting unit 126 according to the second exemplary embodiment sets a predetermined range including an input start position as an "input start area" for each of the plurality of touch positions used for the multi-touch operation. The area setting unit 126 stores information indicating the ranges of the respective "input start areas" into the RAM 104 in association with identifiable IDs.

Touch positions detected by the detection unit 121 are associated with IDs in order of detection of the touch positions. For example, suppose that the user input the previous multi-touch operation by using an index finger and a middle finger, and the position touched with the index finger was detected with ID=1 and the position touched with the middle finger was detected with ID=2. When the user inputs the same type of operation the next time, the touch positions are not necessarily detected in the same order. The position touched with the middle finger for the second time may be detected with ID=1, and the position touched with the index finger may be detected with ID=2. The determination unit 122 therefore determines whether a multi-touch operation is likely to be repeated, by using the condition that the touch positions are included in any one of the "input start areas" based on the plurality of touch start positions of the previous multi-touch operation irrespective of the IDs.

Like the first exemplary embodiment, the information processing apparatus 100 according to the second exemplary embodiment basically performs the main processing according to the flowchart of FIG. 2A.

Figure 5:
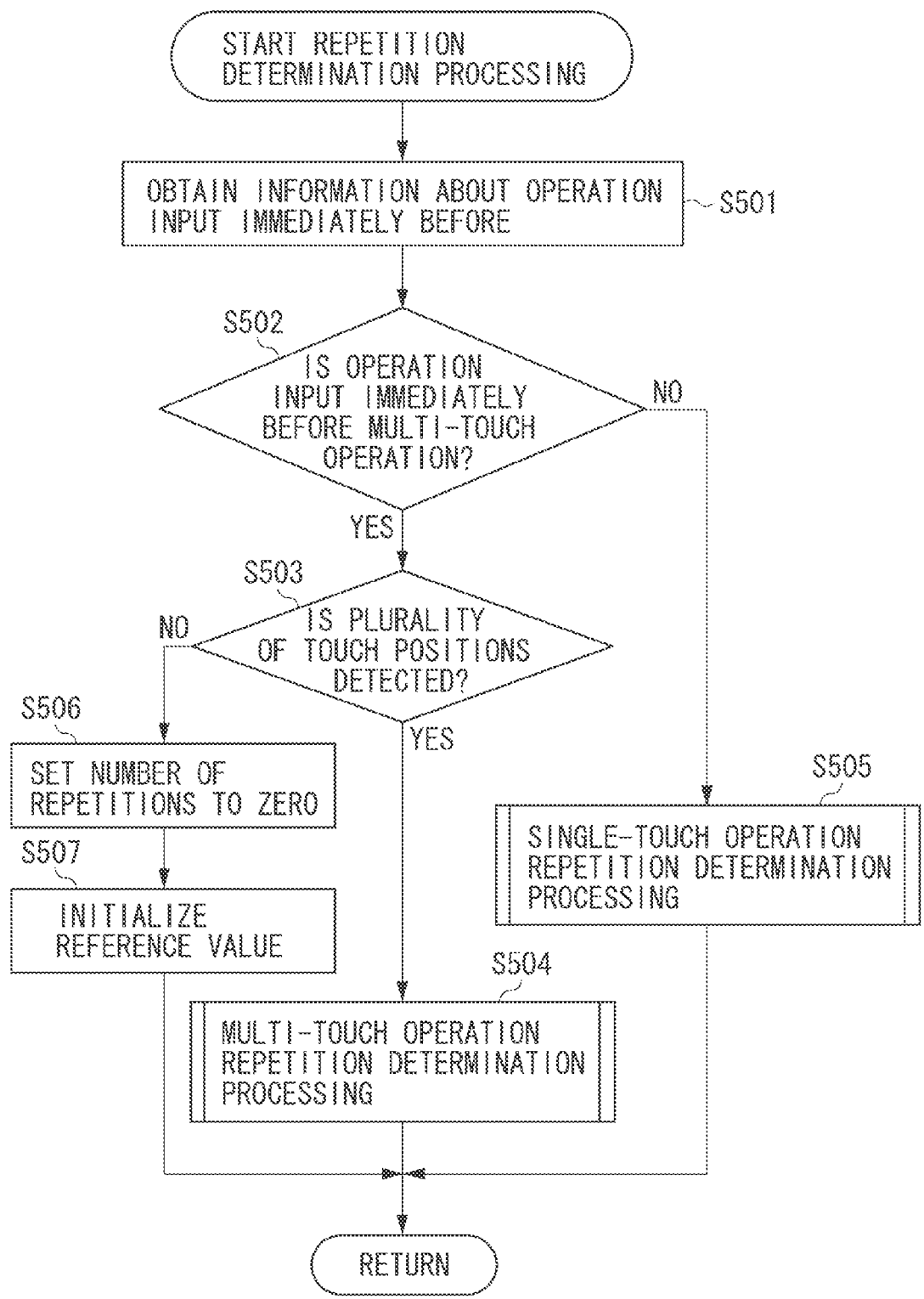
FIG. 5 is a flowchart illustrating an example of processing for determining repetition of a single-touch operation, which is performed by an information processing apparatus on which multi-touch operations can be repeated.

In the repetition determination processing (step S202), the information processing apparatus 100 calls and performs the flowchart illustrated in FIG. 5.

The repetition determination processing performed in the second exemplary embodiment will be described with reference to the flowchart of FIG. 5.

In step S501, the determination unit 122 reads and obtains information about the operation input immediately before from the RAM 104. Step S501 corresponds to step S301 in the flowchart of FIG. 3.

In step S502, the determination unit 122 determines whether the operation input immediately before is a multi-touch operation, based on the obtained information. If the operation input immediately before is determined to be a multi-touch operation (YES in step S502), the processing proceeds to step S503. If the operation input immediately before is determined not to be a multi-touch operation, i.e., to be a single-touch operation (NO in step S502), the processing proceeds to step S505.

In step S503, the determination unit 122 determines whether a plurality of touch positions is detected. In the present exemplary embodiment, the number of detected touch positions can be found out by referring to the information about the ID(s) of the touch position(s) included in the information of interest stored in the RAM 104. The determination unit 122 then refers to the information of the RAM 104 and makes the determination. If a plurality of touch positions is determined to be detected (YES in step S503), the processing proceeds to step S504. If a plurality of touch positions is determined not to be detected (NO in step S503), the processing proceeds to step S506. However, the determination unit 122 determines a plurality of touch positions not to be detected if a second touch position is not detected within a certain period of time after the detection of a first touch position. If it is within the certain period of time, the determination unit 122 waits for a second input.

In step S504, the determination unit 122 performs processing for determining whether the same type of multi-touch operation as that input immediately before is likely to be repeated. The processing will be described in detail below with reference to the flowchart of FIGS. 6A and 6B.

In step S505, the determination unit 122 performs processing for determining whether the same type of single-touch operation as that input immediately before is likely to be repeated. In step S505, the determination unit 122 performs the processing according to the flowchart of FIG. 3 described above. A description thereof will be omitted here.

The processing proceeds to step S506 if the operation input immediately before is a multi-touch operation and the number of touch positions detected is one. In such a case, the possibility for a single-touch operation to be made is considered to be high, and the possibility for the multi-touch operation to be repeated is considered to be low. In step S506, the determination processing unit 122 therefore sets the value of the number of repetitions stored in the RAM 104 to zero. In step S507, the determination unit 122 initializes the reference value serving as the condition for identifying the input operation as the same type of operation as that input immediately before. The processing performed in steps S506 and S507 is similar to the processing performed in steps S306 and S307 of the flowchart of FIG. 3.

Figure 6A:
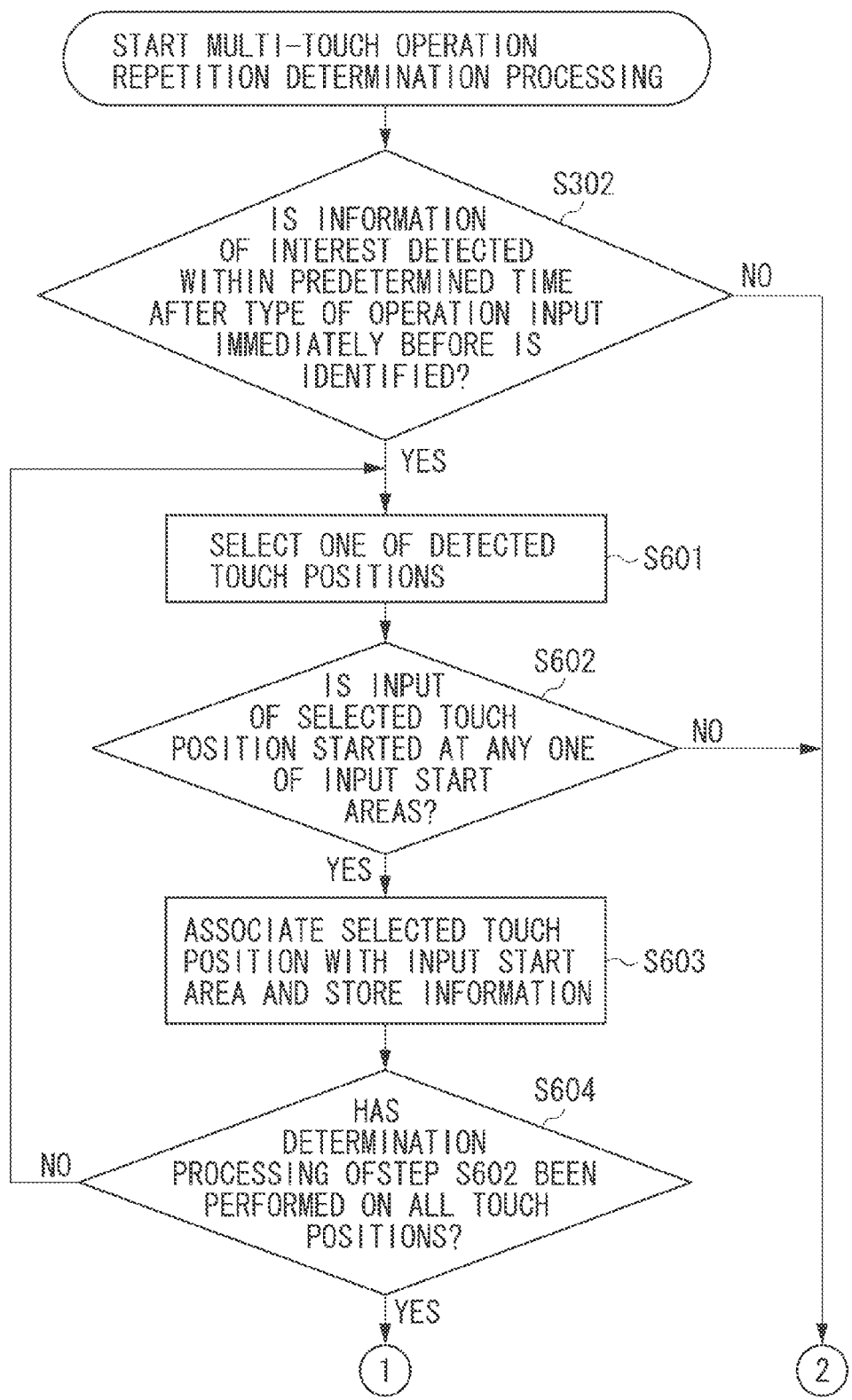
FIGS. 6A and 6B are flowcharts illustrating an example of processing for determining repetition of a multi-touch operation.
Figure 6B:
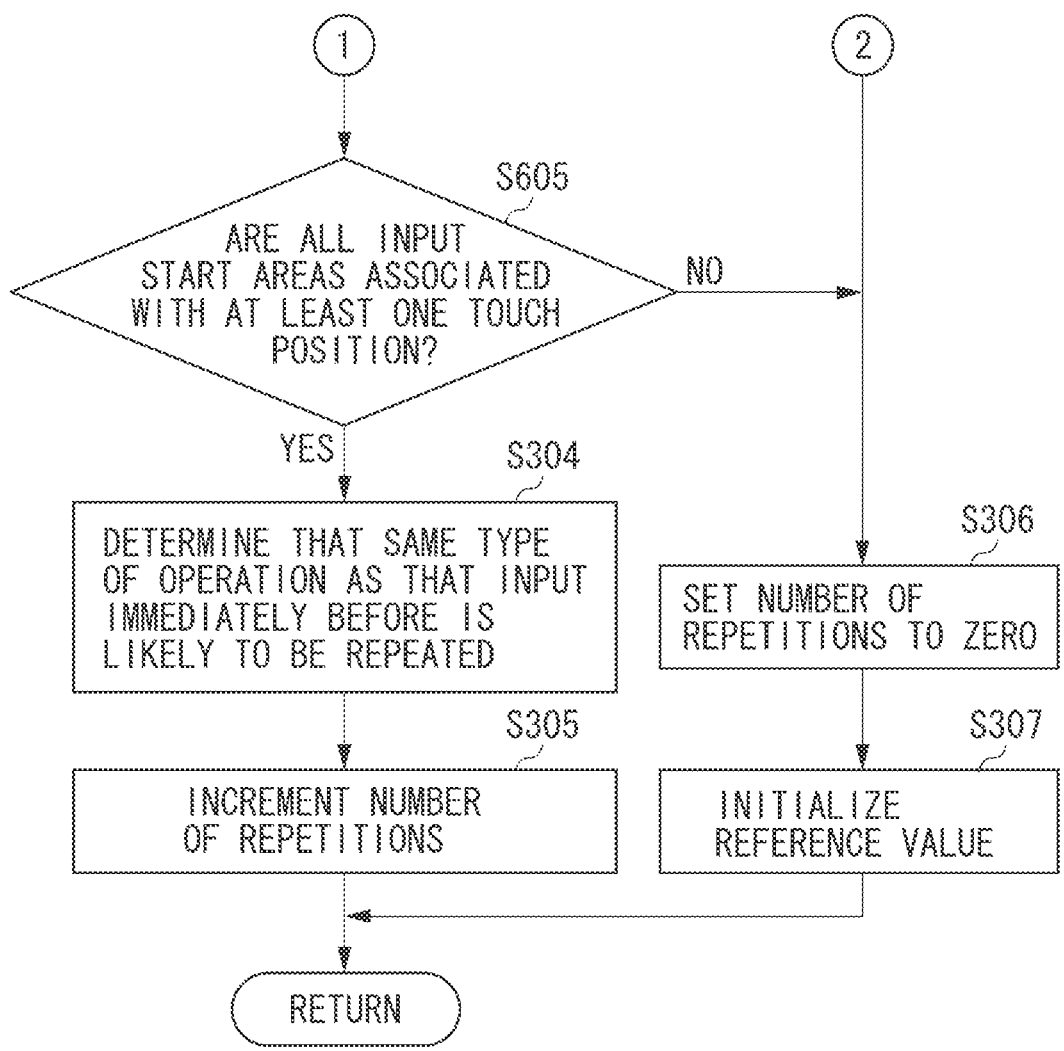

Next, details of the multi-touch operation repetition determination processing performed in step S504 will be described with reference to the flowchart of FIGS. 6A and 6B. Processing steps similar to those of the single-touch operation repetition determination processing described according to the first exemplary embodiment are designated by the same reference numerals. Thus, detailed descriptions thereof will be omitted.

Even with multi-touch operations, the determination unit 122 determines that the same type of operation as that input immediately before is likely to be repeated if the information of interest is input immediately after the end of the operation input immediately before and the input is considered to be started at a position where the operation input immediately before is started. The determination unit 122 can thus start the determination processing at least when information about the first touch position at which a new input operation is started is detected as information of interest.

In the second exemplary embodiment, the information about the operation input immediately before has been obtained in step S501. As for the multi-touch operation repetition determination processing, in step S302, the determination unit 122 therefore initially determines whether the information of interest is detected within a predetermined time after the type of the operation input immediately before is identified. If the information of interest is determined to be detected within the predetermined time after the type of the operation input immediately before is identified (YES in step S302), the processing proceeds to step S601. If the information of interest is determined not to be detected within the predetermined time after the type of the operation input immediately before is identified (NO in step S302), the processing proceeds to step S306.

In step S601, the determination unit 122 selects one of the plurality of touch positions detected by the detection unit 121. In the present exemplary embodiment, the determination unit 122 selects one of the IDs for identifying the touch positions included in the information of interest stored in the RAM 104. If the determination unit 122 performs the processing of step S601 for the second and subsequent times, the determination unit 122 selects one of the IDs not selected by the previous selection(s).

In step S602, the determination unit 122 determines whether the input of the selected touch position is started at any one of the input start areas. In the present exemplary embodiment, the determination unit 122 initially obtains coordinate information about a touch position on which a detection start flag of "TRUE" is set from the information stored in the RAM 104 in association with the selected ID. The determination unit 122 then determines whether the obtained coordinate information indicates a position included in any one of the plurality of "input start areas" set by the area setting unit 126. If the input of the selected touch position is determined to be started at any one of the input start areas (YES in step S602), the processing proceeds to step S603. If the input of the selected touch position is determined not to be started at any of the input start areas (NO in step S602), the processing proceeds to step S306.

In step S603, the determination unit 122 associates the selected touch position with the "input start area" at which the input of the touch position is started, and stores the information in the RAM 104. In the present exemplary embodiment, the touch position and the "input start area" have respective IDs. The determination unit 122 thus associates the IDs with each other. Since the plurality of "input start areas" can overlap each other, the association is not necessarily made on a one-to-one basis. One touch position may be associated with a plurality of "input start areas".

In step S604, the determination unit 122 determines whether the determination processing of step S602 has been performed on all the detected touch positions. If the determination processing of step S602 is determined to have been performed on all the touch positions (YES in step S604), the processing proceeds to step S605. If the determination processing of step S602 is determined not to have been performed on all the touch positions (NO in step S604), the processing returns to step S601 to repeat the processing.

In step S605, the determination unit 122 determines whether all the input start areas are associated with at least one touch position. To determine whether the same type of multi-touch operation is likely to be repeated, at least one touch position needs to start to be input at each of the "input start areas". The reason is that if the "input start areas" include any area at which no touch position starts to be input, it means that the start positions of the new multi-touch operation starting to be input are significantly different from those of the multi-touch operation input immediately before. To determine whether the same type of multi-touch operation as that input immediately before is likely to be repeated, the determination unit 122 according to the present exemplary embodiment refers to association information stored in the RAM 104 and determines whether all the input start areas are associated with at least one touch position. If all the input start areas are determined to be associated with at least one touch position (YES in step S605), the processing proceeds to step S304. If all the input start areas are determined not to be associated with at least one touch position (NO in step S605), the processing proceeds to step S306.

In steps S304 to S307, the determination unit 122 performs similar processing to that of the first exemplary embodiment. Thus, descriptions thereof will be omitted. After the completion of the processing, the processing returns to the main processing.

Even in the second exemplary embodiment, the information processing apparatus 100 performs the processing for setting the condition for identifying the type of an operation (step S204) by calling and performing the flowchart illustrated in FIG. 4A, according to the result of the repetition determination. The processing will be described below with respect to each type of an operation input immediately before, identified in step S401.

<Multi-Drag>

Suppose that in step S401, the condition setting unit 124 identifies the operation input immediately before as a multi-drag. In such a case, in step S402, the condition setting unit 124 sets a reference value corresponding to the number of repetitions of a multi-drag operation. FIG. 9B illustrates an example of information in which the number of repetitions is associated with reference values to be set for a multi-drag operation. A predetermined condition for a multi-drag operation to be identified is that two touch positions are moved over a moving distance more than a predetermined reference value while maintaining a generally constant distance therebetween. For example, if the number of repetitions is one, the moving distance or the reference value for a multi-drag operation to be identified is "20". The numerical value is in units of [dots]. This reference value means that if the moving distance of the touch positions derived from the information of interest exceeds 20 dots, the type of the operation input based on the information of interest is identified as a multi-drag. If the number of repetitions is two, the reference value is set to "10". If the number of repetitions is three or more, the reference value is set to "5". That is, the greater the number of repetitions, the smaller the reference value for a multi-drag operation to be identified is so that a multi-drag becomes easier to be identified.

Figure 7:
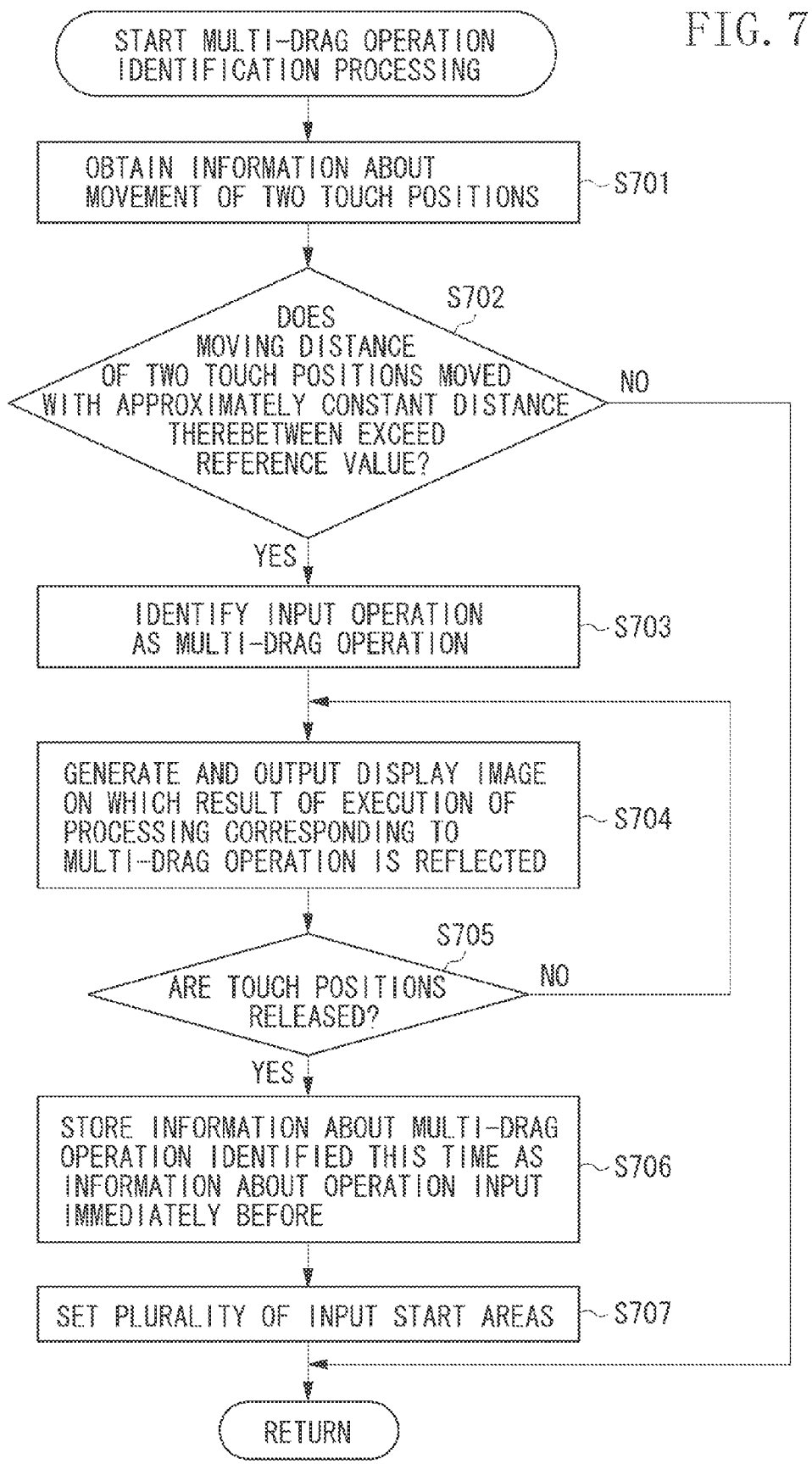
FIG. 7 is a flowchart illustrating an example of processing for identifying an operation type as a multi-drag operation.

The subsequent processing (steps S205 and S206) will be described below on the assumption that the operation input immediately before is a multi-drag. FIG. 7 is a flowchart illustrating an example of processing for identifying an input operation as a multi-drag operation repeatedly input.

In step S701, the identification unit 125 obtains information about the movement of the two touch positions from the start of the touch. In the present exemplary embodiment, the identification unit 125 obtains information about the moving distance over which the two touch positions are moved and the distance between the two touch positions before and after the movement from the information of interest stored in the RAM 104 by the detection unit 121. If there are three or more touch positions detected by the detection unit 121, the identification unit 125 obtains information about the touch positions of the two earliest detection times.

In step S702, the identification unit 125 determines whether the moving distance of the two touch positions moved with a approximately constant distance therebetween exceeds a reference value. If the condition setting unit 124 has not set a reference value in step S402, the identification unit 125 reads a predetermined reference value stored in the storage unit 127. If the condition setting unit 124 has set a reference value in step S402, the identification unit 125 uses the notified reference value. If the moving distance is determined to exceed the reference value (YES in step S702), the processing proceeds to step S703. If the moving distance is determined not to exceed the reference value (NO in step S702), the processing returns to the main processing. Then, the main processing ends.

In step S703, the identification unit 125 identifies the operation input based on the information of interest as a multi-drag operation.

In step S704, the display control unit 128 generates a display image on which a result of execution of processing corresponding to the multi-drag operation is reflected, and outputs the display image to the output device 110. For example, the display control unit 128 changes a display image according to a specific rule, and feeds back the resulting display image to the user. Here, the display control unit 128 identifies the direction and the amount of operation of the multi-drag by using the information of interest stored in the RAM 104 by the detection unit 121, and reflects the direction and the amount of operation on the output.

In step S705, the identification unit 125 determines whether the touch positions are released, based on the information of interest detected by the detection unit 121 at predetermined time intervals. If the touch positions are determined to be released (YES in step S705), the processing proceeds to step S706. If the touch positions are determined not to be released (NO in step S705), the processing returns to step S704, and the display control unit 128 continues performing the processing corresponding to the multi-drag until the touch positions are released.

In step S706, the identification unit 125 stores information about the multi-drag operation identified this time into the RAM 104 as information about an operation input immediately before. In the present exemplary embodiment, the identification unit 125 stores information about the identified type of the operation, the time at which the type is identified, and the plurality of touch positions at which the identified operation is started as the information about the operation input immediately before.

In step S707, the area setting unit 126 sets "input start areas", which are the specific ranges where the same type of operation as that identified this time is likely to be input, on the input area of the touch panel display 111. Here, the area setting unit 126 sets a plurality of "input start areas" based on the respective plurality of touch positions. Specifically, the area setting unit 126 obtains two pieces of position information on which the new detection flag of "TRUE" is set among the pieces of information of interest stored in the RAM 104, and identifies two areas including the respective positions. For example, the area setting unit 126 sets circles having a radius of 50 dots about the respective touch positions as the "input start areas". The area setting unit 126 then initializes the information of interest that has been stored in the RAM 104 by the detection unit 121.

Figure 11A:
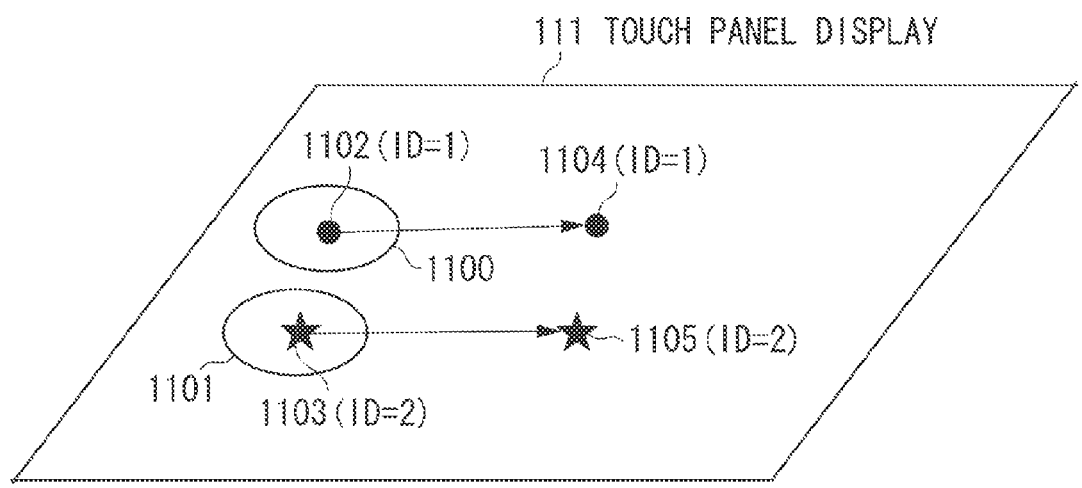
FIGS. 11A, 11B, 11C, and 11D are diagrams illustrating examples where a multi-touch operation is determined to be repeated based on detected touch positions.

A specific example of "input start areas" that are set based on information about positions at which a multi-touch operation input immediately before is started will be described with reference to FIG. 11A. In FIG. 11A, a position 1102 represents the input start position of a touch position having an ID=1, and a position 1103 represents the input start position of a touch position having an ID=2. In FIGS. 11A to 11D, touch positions having an ID=1 are symbolized by a black circle. Touch positions having an ID=2 are symbolized by a black star. Positions 1104 and 1105 represent the touches when the respective touch positions are moved and the input operation is identified as a multi-drag. An area 1100 represents a "first input start area" which is set based on the position 1102. An area 1101 represents a "second input start area" which is set based on the position 1103. Each "input start area" is set as an area having a radius of 50 dots about the start position of the touch input. Like the first exemplary embodiment, the input start areas are not limited to circles having a radius of 50 dots, and may be defined by using other methods.

Figure 11B:
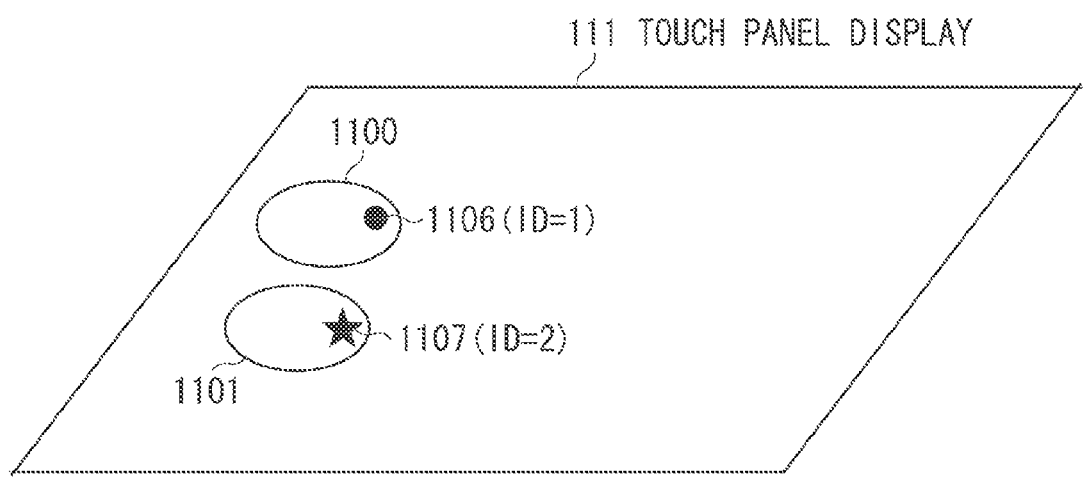
Figure 11C:
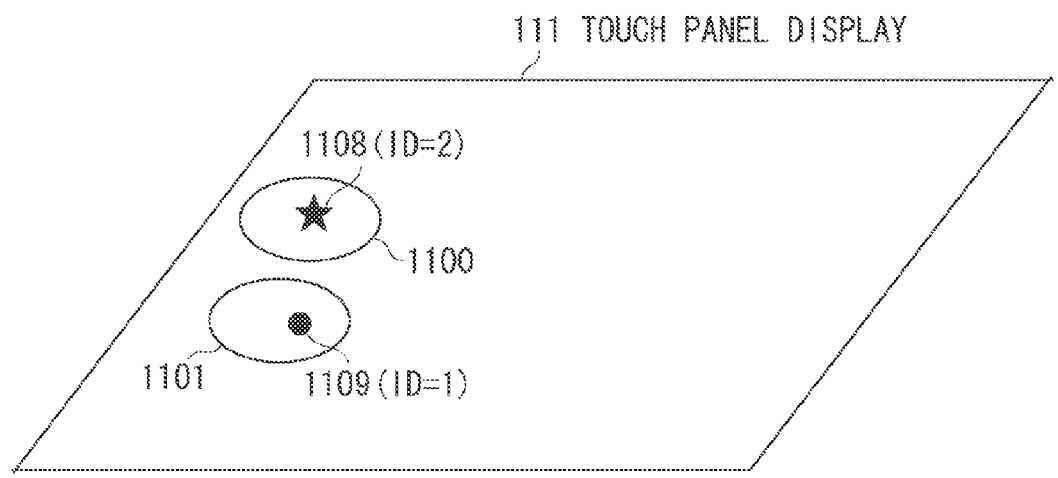
Figure 11D:
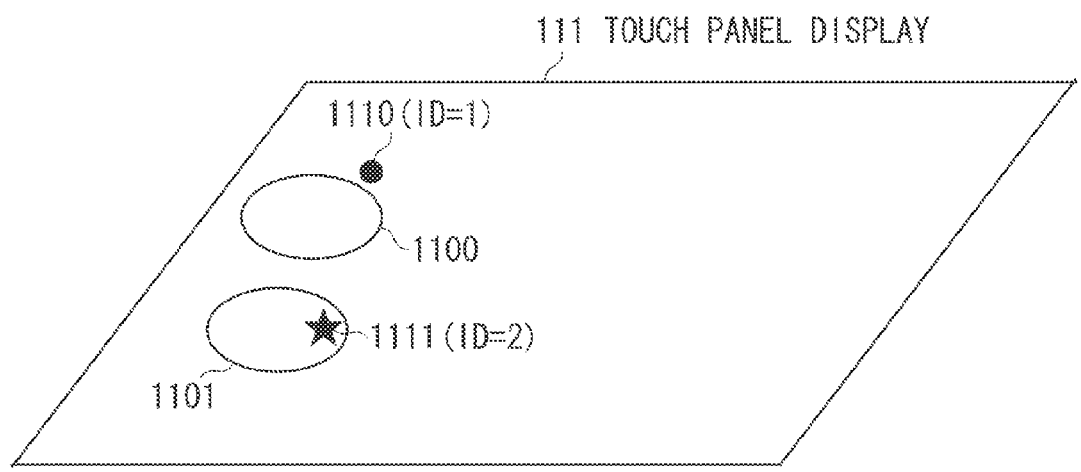

FIGS. 11B to 11D illustrate start positions of the next multi-touch operation input after the type of the multi-drag operation illustrated in FIG. 11A is identified.

In FIG. 11B, a touch position 1106 having an ID=1 is started from inside the "first input start area" 1100. A touch position 1107 having an ID=2 is started from inside the "second input start area" 1101. In FIG. 11C, a touch position 1109 having an ID=1 is started from inside the "second input start area" 1101. A touch position 1108 having an ID=2 is started from inside the "first input start area" 1100. In both FIGS. 11B and 11C, the touch positions are each included in any one of the "input start areas", and all the "input start areas" are associated with at least one touch position. The determination unit 122 thus determines that the same type of operation as the multi-touch operation input immediately before is likely to be repeated.

In FIG. 11D, a touch position 1111 having an ID=2 is started from inside the "second input start area" 1101, whereas a touch position 1110 having an ID=1 is started from outside the "first input start area" 1100. The determination unit 122 therefore determines that the same type of operation is not likely to be repeated.

Up to this point, processing for determining that a multi-touch operation is likely to be repeatedly input before controlling the condition for identifying an input operation as the same type of operation as repeated has been described by using a multi-drag as an example.

<Pinch>

Next, a description will be given of the case where the operation input immediately before is identified as a pinch in step S401. In such a case, in step S402, the condition setting unit 124 sets a reference value corresponding to the number of repetitions of a pinch operation. FIG. 9C illustrates an example of information in which the number of repetitions is associated with reference values to be set for a pinch operation. A predetermined condition for a pinch operation to be identified is that the amount of change in the distance between two touch positions exceeds a predetermined reference value. For example, if the number of repetitions is one, the amount of change in the distance between the two touch positions or the reference value for a pinch operation to be identified is "20". The numerical value is in units of [dots]. This reference value means that if the amount of change in the distance between the two touch positions derived from the information of interest exceeds 20 dots, the type of the operation input based on the information of interest is identified as a pinch. As with a flick and a multi-drag, the greater the number of repetitions of a pinch, the smaller the reference value for a pinch operation to be identified is so that a pinch becomes easier to be identified.

The subsequent processing (steps S205 and S206) will be described below with reference to the flowchart of FIG. 8 on the assumption that the operation input immediately before is a pinch. A description of processing similar to that of FIG. 7 with a multi-drag will be omitted.

Figure 8:
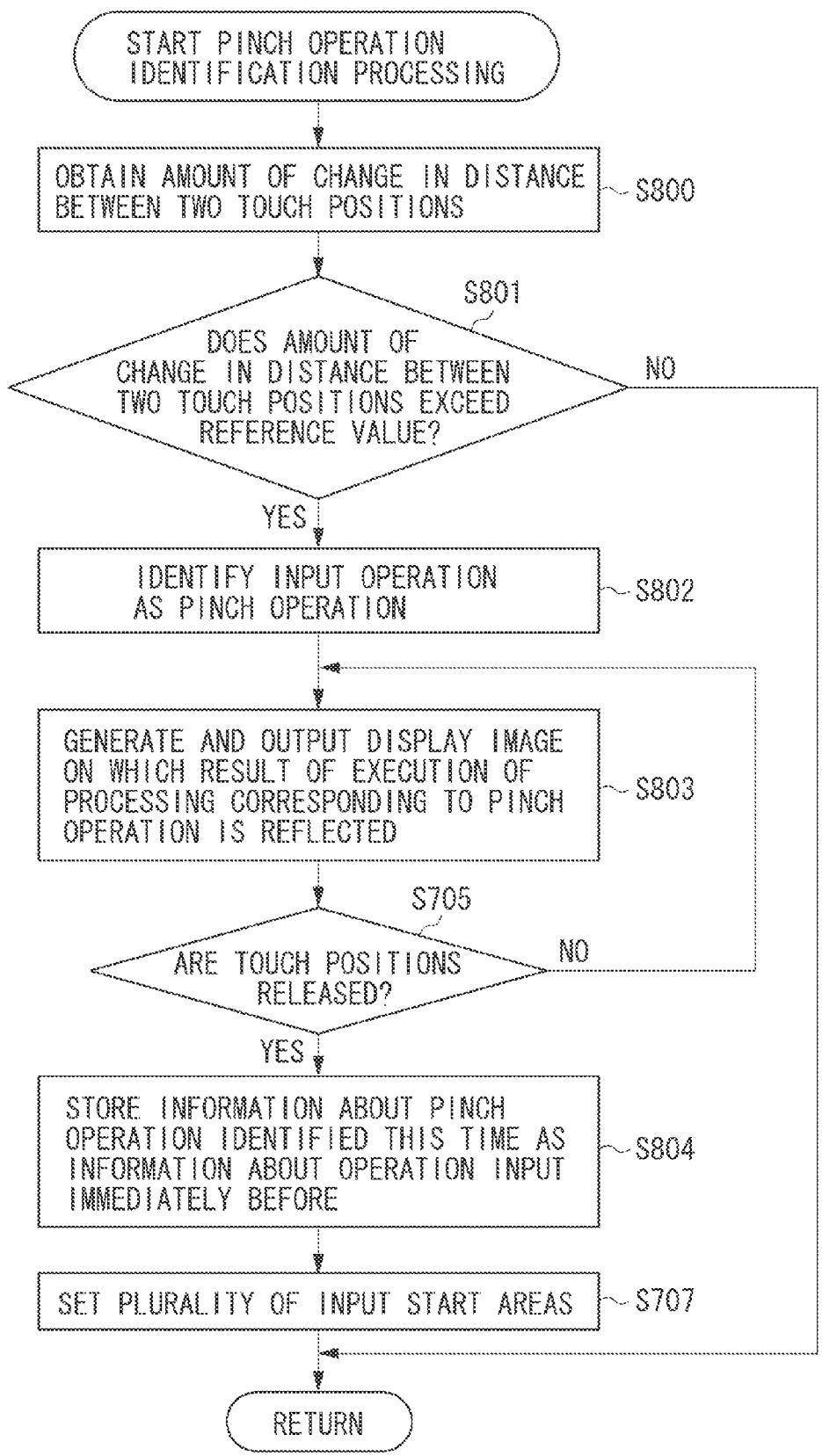
FIG. 8 is a flowchart illustrating an example of processing for identifying an operation type as a pinch operation.

In step S800 in the flowchart of FIG. 8, the identification unit 125 obtains the amount of change in the distance between the two touch positions as information about the movement.

In step S801, the identification unit 125 determines whether the amount of change in the distance between the two touch positions exceeds the reference value. If the amount of change in the distance between the two touch positions is determined to exceed the reference value (YES in step S801), the processing proceeds to step S802. If the amount of change in the distance between the two touch positions is determined not to exceed the reference value (NO in step S801), the processing returns to the main processing. Then, the main processing ends.

In step S802, the identification unit 125 identifies the input operation based on the information of interest as a pinch operation.

In step S803, the display control unit 128 generates a display image on which a result of execution of processing corresponding to the pinch operation is reflected, and outputs the display image to the output device 110. For example, the display control unit 128 enlarges (or reduces) a display image displayed on the touch panel display 111 according to the amount of change in the distance between the two touch positions, and feeds back the resulting display image to the user. Here, the display control unit 128 identifies the direction and the amount of operation of the pinch by using the information of interest stored in the RAM 104 by the detection unit 121, and reflects the direction and the amount of operation on the output.

In step S804, the identification unit 125 stores information about the pinch operation identified this time into the RAM 104 as information about an operation input immediately before. In the present exemplary embodiment, the identification unit 125 stores information about the type of the identified operation, the time at which the type is identified, and the plurality of touch positions at which the identified operation is started as the information about the operation input immediately before.

Described above are the details of the processing performed if the operation input immediately before is identified as a pinch operation in step S401.

As the user repeats a pinch operation, the user may make a rough input with insufficient amounts of change of the two touch positions that are detected as the amount of operation of a pinch operation. Even in such a case, the input operation can be identified as a pinch operation by the processing of the second exemplary embodiment. However, if the amounts of change of the two touch positions detected as the amount of operation of a pinch operation are insufficient, the input pinch operation may fail to provide an output intended by the user. For example, if the processing corresponding to a pinch is enlargement of a display image, the enlargement rate of the output display image can be smaller than intended by the user. If the identified operation is a pinch operation, the information processing apparatus 100 may correct a parameter of the operation corresponding to the pinch when the condition setting unit 124 reduces the reference value according to the number of repetitions in step S402.

FIG. 9D illustrates an example of information in which the number of repetitions is associated with correction values for the enlargement rate that is an example of the parameter to be set. If the number of repetitions is zero, the enlargement rate of the display image is typically made to coincide with the rate of change of the distance between the two touch operations. For example, suppose that an initial value of the distance between the two touch positions is 200 dots. If the touch positions are moved to 400 dots, the enlargement rate is twice. According to the second exemplary embodiment, if the number of repetitions is one, the enlargement rate of 2 derived from the amount of change is further multiplied by a correction value of 1.2 to enlarge the display image at an enlargement rate of 2.4 times. Similarly, if the number of repetitions is two, the enlargement rate is 2×1.5=3.0 times. If the number of repetitions is three or more, the enlargement rate is 2×2.0=4.0 times. As a result, even if the change in the distance between the two touch positions is insufficient, the enlargement rate of the display image can be corrected to provide feedback as intended by the user.

Up to this point, the processing for determining that a multi-touch operation is likely to be repeatedly input before controlling the condition for identifying an input operation as the same type of operation as repeated has been described by using a pinch as an example.

<Rotate>

The information processing apparatus 100 performs similar processing if the operation input immediately before is identified as a rotate. In step S402, the condition setting unit 124 sets a reference value corresponding to the number of repetitions of a rotate operation. A predetermined condition for a rotate operation to be identified is that the amount of change in the angle formed by a line joining two touch positions before and after a movement of the touch positions exceeds a predetermined reference value. As with a flick, multi-drag, and pinch, the greater the number of repetitions of a rotate, the smaller the reference value for a rotate operation to be identified is so that a rotate becomes easier to be identified.

If the operation input immediately before is a rotate, the processing performed in steps S205 and S206 is similar to that of a multi-drag or that of a pinch illustrated in FIG. 8. Detailed descriptions thereof will be thus omitted.

For a rotate operation, the identification unit 125 obtains the amount of change in the angle formed by the line joining the two touch positions before and after the movement of the touch positions. If the obtained amount of change exceeds the reference value, the identification unit 125 identifies the input operation as a rotate. The display control unit 128 then generates a display image rotated according to the rotate operation, and outputs the display image to the output device 110.

As with a pinch, the information processing apparatus 100 can set a parameter to be used for the output processing of a rotate as well as the reference value according to the number of repetitions. The reason is that as the user repeats an operation for rotating a display image by a rotate, the user may make a rough input with insufficient movements of the touch positions, in which case the information processing apparatus 100 may fail to provide an output intended by the user. For a rotate, the information processing apparatus 100 corrects the amount of rotation of the display image according to the number of repetitions.

Up to this point, the processing for determining that a multi-touch operation is likely to be repeatedly input before controlling the condition for identifying an input operation as the same type of operation as repeated has been described by using a rotate as an example.

As described above, according to the second exemplary embodiment, the information processing apparatus 100 changes the condition for identifying the same type of operation as that input immediately before if the possibility for the same type of operation to be repeatedly input is considered to be high, taking into account the situations where the operation input immediately before is a multi-touch operation. In particular, the information processing apparatus 100 can accurately determine the likeliness of repetition regardless of the order in which a plurality of touch positions constituting a multi-touch operation is detected. As a result, an input operation becomes easier to be identified as the same type of operation as that input immediately before than when the same type of operation is considered to be less likely to be repeatedly input. Consequently, even if the user makes rough inputs with insufficient amounts of movement of the touch positions as the user repeats operations, the operations are more likely to be recognized as intended by the user. In other words, malfunctions to the user can be reduced. Even in the second exemplary embodiment, the information processing apparatus 100 changes the strictness of the condition (the magnitude of the reference value) according to the number of times the same type of operation has been repeated. As the number of repetitions increases and inputs tend to be rougher, an input operation becomes easier to be identified as the same type of operation as that input immediately before. If the condition for identifying the same type of operation as that input immediately before is not satisfied, the information processing apparatus 100 performs processing corresponding to various operations other than that input immediately before, provided that predetermined conditions for identifying the input of the ordinary other operations are satisfied.

While the present exemplary embodiment deals with the case of performing processing by using information about two touch positions, similar processing can be performed with three or more touch positions.

Like the first exemplary embodiment, a modification in which if the number of repetitions exceeds a certain number of times, an input operation is identified as the same type of operation as that input immediately before at the point in time when the same type of operation is determined to be likely to be repeated may be applied to the case of repeating a multi-touch operation.

According to such a modification, if the same type of operation is repeated many times, the information processing apparatus 100 provides feedback when the user starts a touch. The user can thus quickly obtain a desired result.

Like the first exemplary embodiment, a modification for setting an "input start area" based on a position where the operation input immediately before is ended may be applied to the case of repeating a multi-touch operation. In such a case, the area setting unit 126 sets a plurality of "input start areas". If all the "input start areas" include any one of a plurality of touch positions detected as information of interest, the determination unit 122 determines that the same type of multi-touch operation is likely to be repeated. The user may make rough inputs with insufficient amounts of movement as the user repeats multi-touch operations of opposite directions alternately. Even in such a case, according to the modification, the operations are more likely to be recognized as intended.

Like the first exemplary embodiment, a modification in which average coordinates of positions where the same type of operations repeatedly input are started are used as position information serving as a reference for setting an "input start area" may be applied to the case of repeating a multi-touch operation. Position information serving as references for setting "input start positions" may be set based on a difference between the input start positions of two successive operations. Some part of a display image can become unavailable to start a touch input depending on the contents of the display image. Even if the user changes the position to start an operation, the modification allows the information processing apparatus 100 to make a determination by absorbing such an error.

An exemplary embodiment of the present disclosure is not limited to the input of touch operations to a touch panel, and is applicable to cases where the same type of input operation made by a user can be recognized a plurality of times in succession. Even in such cases, if the same type of operation as that input immediately before is determined to be likely to be repeated based on detected information of interest, a condition is changed so that the next operation input based on the information of interest becomes easier to be identified as the same type of operation as that input immediately before. User's input operations may include an operation of pressing an operation button. Human actions for making a gesture input may be included. Examples of processing performed according to the type of an input operation may include drawing processing for displaying an image and sound output processing.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an exemplary embodiment of the present disclosure, the user's input can be identified as an intended operation type even if the same type of operation is being repeated.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-143696 filed Jul. 9, 2013, which is hereby incorporated by reference herein in its entirety.

What is claimed is:

1. An information processing apparatus configured to perform processing according to a type of an input operation, the information processing apparatus comprising:
   a determination unit configured to determine whether a same type of operation as an operation input immediately before is likely to be repeated, based on input information of interest and information about the operation input immediately before;
   an identification unit configured to identify the input operation based on the information of interest according to that the information of interest satisfies a predetermined condition set in advance; and
   a setting unit configured to, if the determination unit determines that the same type of operation as the operation input immediately before is likely to be repeated, set a condition for the identification unit to identify the input operation based on the information of interest as the same type of operation as the operation input immediately before so that the set condition is easier to be satisfied than the predetermined condition.

2. The information processing apparatus according to claim 1, wherein the predetermined condition is that a value obtained based on the information of interest exceeds a predetermined reference value set for each type of operation, and
   wherein the setting unit is configured to, if the determination unit determines that the same type of operation as the operation input immediately before is likely to be repeated, set the condition easier to be satisfied than the predetermined condition by setting a condition that the value obtained based on the information of interest exceeds a reference value lower than the predetermined reference value as the condition for the input operation based on the information of interest to be identified as the same type of operation as the operation input immediately before.

3. The information processing apparatus according to claim 1, wherein the determination unit is configured to, if the information of interest is detected within a predetermined time after the type of the operation input immediately before is identified, determine that the same type of operation as the operation input immediately before is likely to be repeated.

4. The information processing apparatus according to claim 1, further comprising a detection unit configured to detect input position information as the information of interest.

5. The information processing apparatus according to claim 4, wherein the determination unit is configured to, if position information first detected by the detection unit after the type of the operation input immediately before is identified is information about a position included in a specific area, determine that the same type of operation as the operation input immediately before is likely to be repeated.

6. The information processing apparatus according to claim 5, wherein the specific area includes a position detected by the detection unit when an input of the operation input immediately before is started.

7. The information processing apparatus according to claim 5,
wherein the detection unit is configured to detect information about a touch position touched on an input area by a user, and
wherein the specific area is a partial area of the input area.

8. The information processing apparatus according to claim 7, wherein if the operation input immediately before is a multi-touch operation, a plurality of specific areas includes a respective plurality of touch positions detected by the detection unit when an input of the multi-touch operation input immediately before is started.

9. The information processing apparatus according to claim 8, wherein the determination unit is configured to, if the operation input immediately before is the multi-touch operation and the plurality of specific areas each includes at least one of a plurality of touch positions first detected by the detection unit after the type of the multi-touch operation input immediately before is identified, determine that the same type of operation as the operation input immediately before is likely to be repeated.

10. The information processing apparatus according to claim 7, wherein the determination unit is configured to, if the operation input immediately before is a flick operation and an input direction determined based on the information of interest is the same as a direction of the flick operation input immediately before, determine that the same type of operation as the operation input immediately before is likely to be repeated.

11. The information processing apparatus according to claim 1, wherein the identification unit is configured to identify the operation input based on the information of interest as the same type of operation as the operation input immediately before according further to that a condition corresponding to a number of repetitions of the same type of operation as the operation input immediately before is satisfied.

12. The information processing apparatus according to claim 1, further comprising an output control unit configured to, if the determination unit determines that the same type of operation as the operation input immediately before is likely to be repeated, cause an output device to perform processing corresponding to the operation identified by the identification unit under a condition corresponding to the number of repetitions of the same type of operation as the operation input immediately before.

13. A method for controlling an information processing apparatus configured to perform processing according to a type of an input operation, the method comprising:
determining by a determination unit that a same type of operation as an operation input immediately before is likely to be repeated, based on input information of interest and information about the operation input immediately before;
identifying by an identification unit an input operation based on the information of interest according to that the information of interest satisfies a predetermined condition set in advance; and
setting by a setting unit, if the determination unit has determined that a same type of operation as the operation input immediately before is likely to be repeated, a condition for the identification unit to identify the operation input based on the information of interest as the same type of operation as the operation input immediately before so that the condition is easier to be satisfied than the predetermined condition.

14. A non-transitory computer-readable storage medium storing a program for causing a computer, when read and executed by the computer, to operate as units of an information processing apparatus comprising:
a determination unit configured to determine whether a same type of operation as an operation input immediately before is likely to be repeated, based on input information of interest and information about the operation input immediately before;
an identification unit configured to identify the input operation based on the information of interest according to that the information of interest satisfies a predetermined condition set in advance; and
a setting unit configured to, if the determination unit determines that the same type of operation as the operation input immediately before is likely to be repeated, set a condition for the identification unit to identify the input operation based on the information of interest as the same type of operation as the operation input immediately before so that the set condition is easier to be satisfied than the predetermined condition.

15. An apparatus comprising:
an obtaining unit configured to obtain information about a position having been input into an input area;
a recognition unit configured to, according to obtainment, by the obtaining unit, of information about one or more positions having been continuously input, recognize an operation corresponding to a condition that the information about one or more positions having been continuously input satisfies as an operation having been input into the apparatus; and
a control unit configured to perform control to set a condition corresponding to an operation repeatedly input into the apparatus at an interval shorter than a predetermined time period to be a condition easier to be satisfied when the recognition unit performs recognition for an N+1th time compared with a condition set when the recognition unit performs recognition for an Nth time, where N is a predetermined value of a natural number which is two or more.

16. The apparatus according to claim 15, wherein, the recognition unit recognizes that an operation corresponding to the condition satisfied by the information about the one or more positions having been continuously input, among conditions, stored in a storage unit and each corresponding to a different one of a plurality of types of operations, has been input into the apparatus.

17. The apparatus according to claim 16,
wherein the plurality of types of operations includes a flick operation, and
wherein, a condition corresponding to the flick operation is a condition defined by a threshold of a flick speed identified by using at least one piece of the information about the one or more positions having been continuously input.

18. The apparatus according to claim 15,
wherein, the information about the one or more positions having been continuously input into the input area is information about one or more touch positions detected during a time period from when a user touches a touch panel corresponding to the input area with a finger to when the user releases the finger, and
wherein, the recognition unit recognizes an operation input into the apparatus according to the user releasing the finger from the touch panel.

19. The apparatus according to claim 15, wherein, based on operations, recognized by the recognition unit, being the same operations successively performed N times in a row, the control unit performs control to set a condition corresponding to a same type of operations as the operations recognized N times in a row to be a condition easier to be satisfied compared with a condition set when the operations are recognized for the Nth time in a row.

20. The apparatus according to claim 19, further comprising a determination unit configured to determine whether the operations recognized by the recognition unit are the same operations successively performed for the Nth time in a row,
wherein, in a case where the determination unit determines that the operations recognized by the recognition unit are the same operations successively performed for the Nth time, the control unit performs control to set a condition corresponding to a same type of operations as the operations recognized N times in a row to be a condition easier to be satisfied compared with a condition set before the operations, recognized by the recognition unit, have been determined to be the same operations successively performed for the Nth time in a row.

21. A method for controlling an apparatus, the method comprising:
obtaining, by an obtaining unit, information about a position having been input into an input area;
recognizing, by a recognition unit, according to obtainment by the obtaining unit, of information about one or more positions having been continuously input, an operation corresponding to a condition that the information about one or more positions having been continuously input satisfies as an operation having been input into the apparatus;
performing control, by a control unit, to set a condition corresponding to an operation repeatedly input into the apparatus at an interval shorter than a predetermined time period to be a condition easier to be satisfied when the recognition unit performs recognition for an N+1th time compared with a condition set when the recognition unit performs recognition for an Nth time, where N is a predetermined value of a natural number which is two or more.

22. A non-transitory computer-readable storage medium storing a program for causing a computer, when read and executed by the computer, to operate as units of an apparatus comprising:
an obtaining unit configured to obtain information about a position having been input into an input area;
a recognition unit configured to, according to obtainment, by the obtaining unit, of information about one or more positions having been continuously input, recognize an operation corresponding to a condition that the information about one or more positions having been continuously input satisfies as an operation having been input into the apparatus; and
a control unit configured to perform control to set a condition corresponding to an operation repeatedly input into the apparatus at an interval shorter than a predetermined time period to be a condition easier to be satisfied when the recognition unit performs recognition for an N+1th time compared with a condition set when the recognition unit performs recognition for an Nth time, where N is a predetermined value of a natural number which is two or more.

* * * * *